(12) United States Patent
Arora et al.

(10) Patent No.: US 12,288,457 B2
(45) Date of Patent: Apr. 29, 2025

(54) SMART WEARABLE PERSONAL SAFETY DEVICES AND RELATED SYSTEMS AND METHODS

(71) Applicant: Wearable Technologies Inc., Wilmington, DE (US)

(72) Inventors: Deepak Arora, Hartland, WI (US); Mayur Birari, Wales, WI (US); Ashish Mishra, Hartland, WI (US)

(73) Assignee: Wearable Technologies Inc., Wilmington, DE (US)

( * ) Notice: Subject to any disclaimer, the term of this patent is extended or adjusted under 35 U.S.C. 154(b) by 190 days.

(21) Appl. No.: 17/517,488

(22) Filed: Nov. 2, 2021

(65) Prior Publication Data

US 2022/0180725 A1    Jun. 9, 2022

Related U.S. Application Data

(60) Provisional application No. 63/201,046, filed on Apr. 9, 2021, provisional application No. 63/201,003, filed on Apr. 8, 2021, provisional application No. 63/201,013, filed on Apr. 8, 2021, provisional application No. 63/199,378, filed on Dec. 22, 2020, provisional application No. 63/199,062, filed on Dec. 4, 2020.

(51) Int. Cl.
| G08B 21/18 | (2006.01) |
| G06F 3/16  | (2006.01) |
| G06N 20/00 | (2019.01) |
| H04L 67/10 | (2022.01) |

(52) U.S. Cl.
CPC ............... *G08B 21/18* (2013.01); *G06F 3/16* (2013.01); *G06N 20/00* (2019.01); *H04L 67/10* (2013.01)

(58) Field of Classification Search
CPC .... G08B 21/18; G08B 21/02; G08B 21/0261; G08B 21/043; G08B 21/0446; G08B 25/01; G08B 25/016; H04L 67/10; H04W 4/021; A61B 5/24; A61B 5/746; A61B 5/0002; G06F 3/16; G06N 20/00
See application file for complete search history.

(56) References Cited

U.S. PATENT DOCUMENTS

| 5,148,002 A | 9/1992 | Kuo et al. |
| 5,486,814 A | 1/1996 | Quinones |
| 6,047,203 A | 4/2000 | Sackner |
| 6,054,928 A | 4/2000 | Lemelson et al. |
| 6,154,140 A | 11/2000 | Thorpe et al. |
| 6,687,523 B1 | 2/2004 | Jayaramen et al. |

(Continued)

OTHER PUBLICATIONS

International Search Report and Written Opinion issued for International Application No. PCT/US21/61865 dated Feb. 16, 2022.

*Primary Examiner* — Adnan Aziz
(74) *Attorney, Agent, or Firm* — Husch Blackwell LLP

(57) ABSTRACT

A wearable device and related systems and methods are provided. The device and related systems and method can identify an abnormal condition from data, determine a current condition of a user of the wearable device using the data, monitor the current condition for a change, and transmit one or more of various levels of notifications to a registered device, related devices, or an emergency response provider based on the determination of the current condition and any changes to the current condition.

20 Claims, 21 Drawing Sheets

(56) References Cited

U.S. PATENT DOCUMENTS

| | | |
|---|---|---|
| 7,479,891 B2 | 1/2009 | Boujon |
| 8,022,830 B1 | 9/2011 | Yang |
| 8,099,258 B2 | 1/2012 | Alten et al. |
| 8,531,293 B2 | 9/2013 | Putz |
| 8,665,097 B2 | 3/2014 | Worthington et al. |
| 8,669,876 B2 | 3/2014 | Anderson et al. |
| 8,925,392 B2 | 1/2015 | Esposito et al. |
| 9,011,352 B2 | 4/2015 | Ten Kate et al. |
| 9,177,459 B2 | 4/2015 | Sholder |
| 9,041,530 B2 | 5/2015 | Sprigg et al. |
| 9,055,925 B2* | 6/2015 | Paquet ................. A61B 5/7282 |
| 9,286,781 B2* | 3/2016 | Filson ..................... H04Q 9/00 |
| 9,491,277 B2 | 11/2016 | Vincent |
| 9,554,705 B2 | 1/2017 | Huang |
| 9,589,442 B2 | 3/2017 | Barfield et al. |
| 9,607,498 B2 | 3/2017 | Osorio |
| 9,788,160 B1 | 3/2017 | Gu et al. |
| 9,654,924 B2 | 5/2017 | Jernigan |
| 9,659,484 B1 | 5/2017 | Mehta et al. |
| 9,717,101 B1 | 7/2017 | Burnham |
| 9,788,153 B1 | 10/2017 | Newstadt et al. |
| 10,108,783 B2 | 10/2018 | Horseman |
| 10,134,258 B2 | 11/2018 | Chacon et al. |
| 10,321,873 B2 | 6/2019 | Connor |
| 10,559,191 B2 | 2/2020 | Armstrong et al. |
| 10,588,562 B2 | 3/2020 | Ganesan |
| 10,609,541 B1 | 3/2020 | Govindassamy |
| 10,665,087 B2 | 5/2020 | Han |
| 10,687,273 B1 | 6/2020 | Varma et al. |
| 10,692,348 B2 | 6/2020 | Ruchti |
| 10,736,213 B2 | 8/2020 | Longinotti-Buitoni et al. |
| 10,736,569 B2 | 8/2020 | Bogdanovich et al. |
| 10,777,060 B2 | 9/2020 | Smith et al. |
| 10,789,826 B2 | 9/2020 | Anderson et al. |
| 10,796,548 B2 | 10/2020 | Adoni Mohammed et al. |
| 10,803,723 B2 | 10/2020 | Hurt |
| 10,878,683 B2 | 12/2020 | Howard et al. |
| 11,475,751 B1* | 10/2022 | Lee ....................... A61B 5/7282 |
| 2005/0024188 A1 | 2/2005 | Sider |
| 2005/0034485 A1 | 2/2005 | Klefstad-Sillonville et al. |
| 2005/0038326 A1 | 2/2005 | Mathur |
| 2006/0202816 A1* | 9/2006 | Crump ................. A61B 5/0022 600/300 |
| 2007/0197881 A1* | 8/2007 | Wolf ................... A61B 5/02055 128/920 |
| 2008/0129518 A1 | 6/2008 | Carlton-Foss |
| 2008/0258968 A1 | 10/2008 | Kim |
| 2009/0280705 A1 | 5/2009 | Puls et al. |
| 2010/0267361 A1 | 3/2010 | Sullivan |
| 2011/0025493 A1* | 2/2011 | Papadopoulos .... G08B 21/0453 340/539.12 |
| 2013/0197856 A1 | 8/2013 | Barfield et al. |
| 2014/0184422 A1* | 7/2014 | Mensinger ........... A61B 5/0002 340/870.02 |
| 2014/0206948 A1 | 7/2014 | Romem |
| 2015/0002281 A1 | 1/2015 | Berkobin et al. |
| 2015/0100167 A1* | 4/2015 | Sloo ....................... G08B 17/10 700/278 |
| 2015/0107015 A1 | 4/2015 | Ng |
| 2015/0145662 A1 | 5/2015 | Barfield et al. |
| 2015/0164377 A1 | 6/2015 | Nathan et al. |
| 2015/0201846 A1 | 7/2015 | Maiershon et al. |
| 2015/0269824 A1* | 9/2015 | Zhang ................... A61B 5/746 340/539.12 |
| 2016/0183835 A1 | 6/2016 | Varadan |
| 2016/0272112 A1 | 9/2016 | DeGrazia et al. |
| 2016/0320081 A1 | 11/2016 | Nikovski |
| 2016/0335410 A1 | 11/2016 | Swank |
| 2017/0161614 A1 | 6/2017 | Mehta et al. |
| 2017/0296054 A1 | 6/2017 | Goldstein et al. |
| 2017/0229004 A1 | 8/2017 | Shah et al. |
| 2018/0113986 A1 | 4/2018 | Zhu |
| 2018/0113987 A1* | 4/2018 | Zhu ........................ G16H 40/63 |
| 2018/0354443 A1 | 12/2018 | Ebrahimi et al. |
| 2018/0356509 A1 | 12/2018 | Haghighi |
| 2018/0365957 A1* | 12/2018 | Wright ................. G08B 21/043 |
| 2019/0034712 A1 | 1/2019 | Golan et al. |
| 2019/0213860 A1 | 1/2019 | Shapiro et al. |
| 2019/0052683 A1* | 2/2019 | Logue ..................... H04L 63/08 |
| 2019/0333362 A1 | 4/2019 | Fontanili |
| 2019/0188602 A1 | 6/2019 | Kwant et al. |
| 2019/0385145 A1 | 6/2019 | Abdelkader |
| 2019/0209022 A1 | 7/2019 | Sobol et al. |
| 2019/0385438 A1* | 12/2019 | Cholhan ................. H04W 4/90 |
| 2020/0020221 A1 | 1/2020 | Cutler et al. |
| 2020/0037904 A1 | 2/2020 | Tegen et al. |
| 2020/0053320 A1 | 2/2020 | Mor et al. |
| 2020/0258182 A1 | 2/2020 | Bentley et al. |
| 2020/0082290 A1* | 3/2020 | Pascale ..................... G06N 20/00 |
| 2020/0092681 A1 | 3/2020 | Shapiro et al. |
| 2020/0286355 A1 | 3/2020 | Baker, Jr. |
| 2020/0329451 A1 | 3/2020 | Omar |
| 2020/0250954 A1 | 4/2020 | Tan et al. |
| 2020/0367816 A1 | 5/2020 | Selvam |
| 2020/0211154 A1 | 7/2020 | Ng et al. |
| 2020/0265701 A1* | 8/2020 | Schenker ................ G01C 21/36 |
| 2020/0372778 A1 | 8/2020 | Gregg |
| 2020/0329334 A1 | 10/2020 | Kurian |
| 2020/0334967 A1 | 10/2020 | Sharma et al. |
| 2020/0367790 A1 | 11/2020 | Zhou et al. |
| 2021/0043058 A1* | 2/2021 | Williams ............. G08B 21/0423 |
| 2021/0174920 A1* | 6/2021 | Fan ....................... A61B 5/7275 |
| 2021/0186342 A1* | 6/2021 | Bogdanovich ........ A61B 5/7282 |
| 2021/0217532 A1* | 7/2021 | Heimerl ................. A61B 5/026 |
| 2021/0241927 A1* | 8/2021 | Langdon ............... G16Y 40/10 |
| 2021/0327572 A1* | 10/2021 | Sadhvani ................ G16H 80/00 |
| 2021/0401330 A1* | 12/2021 | Frank ...................... G16H 15/00 |
| 2022/0202373 A1* | 6/2022 | Yocca .................... A61B 5/4035 |

\* cited by examiner

THE STAGES OF ALERT BASED SYSTEM

| 104 MONITOR | 106 DETECT | 108 PREDICT | 110 PROTECT | 112 SOS |
|---|---|---|---|---|
| DEVICE MONITORING FOR ANY ABNORMAL SITUATIONS AS DEFINED BY VARIOUS MACHINE LEARNING ALGORITHMS RUNNING ON THE DEVICE | DEVICE DETECTS AN ABNORMALITY WITH THE WEARER (FALL, WATER HAZARD, GEO-FENCE BREACH, EXTREME TEMPERATURE). AN INFORMATION ALERT IS SENT TO THE REGISTERED GUARDIANS | HAZARD PREDICTION SYSTEM IS ENGAGED TO ASSESS THE WEARER'S CURRENT SITUATION AND PREDICTS POTENTIAL OUTCOMES. AN ALERT OF LEVEL SERIOUS IS SENT TO THE REGISTERED GUARDIANS BASED ON THE PREDICTION ALGORITHM'S ASSESSMENT | A PROTECTION MECHANISM IS INVOKED VIA AN INTERACTIVE VOICE ASSISTANT THAT COMMUNICATES WITH THE WEARER TO GAUGE THE CURRENT CONDITION AND IF HELP IS NEEDED. A CRITICAL ALERT IS SENT TO THE REGISTERED GUARDIANS IF THE WEARER CONFIRMS THAT HELP IS NEEDED. | IF NO AUDIO/VERBAL RESPONSE IS RECEIVED FROM THE WEARER OR THE WEARER'S CONDITION IS CONTINUOUSLY DETERIORATING, SOS SERVICES WILL BE ALERTED IMMEDIATELY AND A HIGH LEVEL ALERT IS SENT TO THE REGISTERED GUARDIANS. |

FIG. 1B

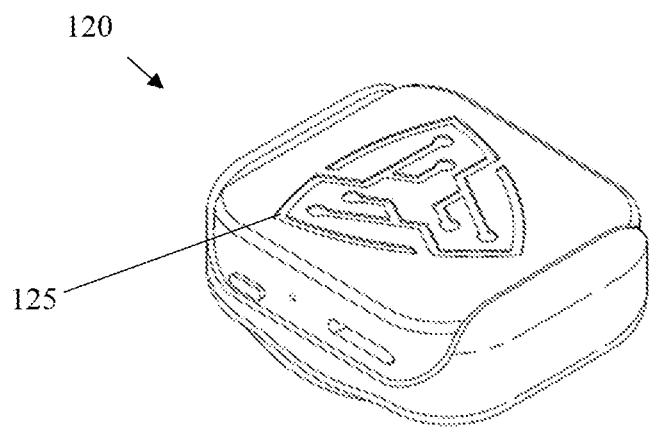
FIG. 2
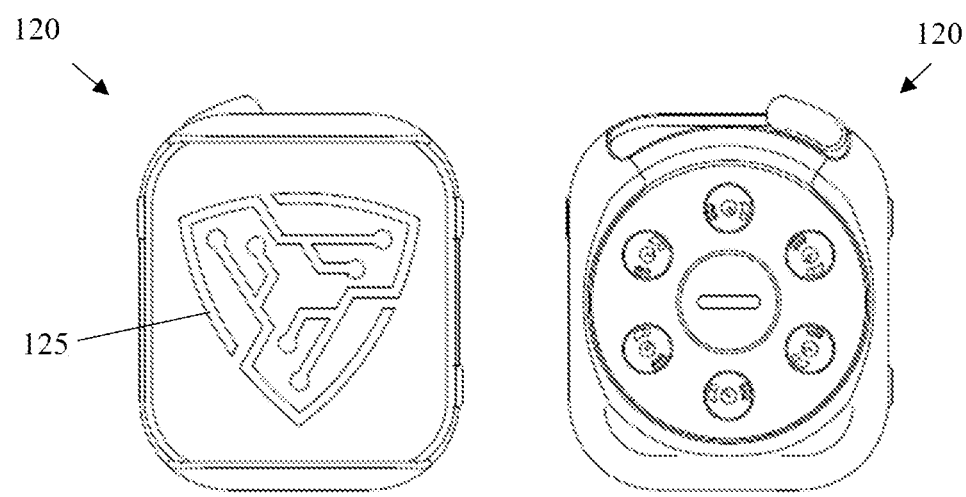
FIG. 3
FIG. 4

SMART WEARABLE PERSONAL SAFETY DEVICES AND RELATED SYSTEMS AND METHODS

CROSS REFERENCE TO RELATED APPLICATIONS

This application claims priority to U.S. Application No. 63/199,062 filed Dec. 4, 2020 and titled "SMART WEARABLE PERSONAL SAFETY SYSTEM AND METHOD," to U.S. Application No. 63/199,378 filed Dec. 22, 2020 and titled "CLOUD-BASED ARTIFICIAL INTELLIGENCE-DRIVEN SAFETY AND ALERT MECHANISM SYSTEM FOR DETECTING AND/OR PREDICTING POTENTIAL WATER HAZARDS," to U.S. Application No. 63/201,003 filed Apr. 8, 2021 and titled "INTERACTIVE VOICE BASED SAFETY AND ALERT MECHANISM SYSTEM FOR DETECTING AND PREDICTING POTENTIAL HAZARDS DUE TO SIGNIFICANT CHANGES IN AMBIENT TEMPERATURE," to U.S. Application No. 63/201,013 filed Apr. 8, 2021 and titled "INTERACTIVE VOICE BASED SAFETY AND ALERT MECHANISM SYSTEM FOR DETECTING AND PREDICTING POTENTIAL GEO-FENCE BREACH HAZARDS," and to U.S. Application No. 63/201,046 filed Apr. 9, 2021 and titled "INTERACTIVE VOICE BASED SAFETY AND ALERT MECHANISM SYSTEM FOR FALL DETECTION AND REDUCING FALSE-POSITIVE ALERTS." U.S. Application Nos. 63/199,062, 63/199,378, 63/201,003, 63/201,013, and 63/201,046 are hereby fully incorporated by reference as if set forth fully herein.

FIELD

The present invention generally relates to smart wearable personal safety devices and related systems and methods. More particularly, such devices, systems and methods can include a wearable artificial intelligence-based system, a smart clothing system, and/or wearables and methods to monitor and potentially prevent unintentional injuries/deaths, track locations, record current physiological conditions, wearer's vitals in real-time and send timely alerts. Furthermore, such devices, systems, and methods can include a cloud enabled artificial intelligence driven interactive safety and alert mechanism system for detecting and predicting potential hazards due to significant changes in ambient temperature, for fall detection, for detecting and predicting potential geofence breach hazards, and/or for detecting and predicting potential water hazards.

BACKGROUND

Unintentional causes of injuries and/or deaths of pets, infants, toddlers, kids, and adults are on a rise across the world. There are many causes of these injuries and deaths including accidental drowning, accidental falls, asphyxia (e.g. kid left locked in a car), infant suffocation, hyperthermia, hypothermia, abduction/missing person cases (amber, silver and blue alerts), older aged adults being left alone for prolonged periods of time, kids or pets wandering off unattended, older adults becoming lost because of special medical conditions like dementia. There are at present no current devices, systems, or methods that satisfactorily mitigate these and other potentially dangerous hazards present in the world today.

For example, in the particular case of known geo-fence devices and systems, these known devices and systems do not keep track of when a wearer has returned to the geo-fenced area or if the wearer is moving towards a known hazardous place such as a road/highway, body of water, ditch, or the like. These known geo-fence devices and systems typically rely solely on a user receiving an alert on their smartphones and/or smart wearable device to inform them that a tracked subject has breached the geo-fence. The user then has to keep the app open at all times to track subject's whereabouts and there exists no contingency for if the user misses the alert notification, which is highly possible in cases where the user is busy at work, driving, sleeping, the smartphone receiving the alert is not charged, and/or the user does not have the smartphone with them at the time of the alert.

Furthermore, in the particular case of known wearable devices or systems that track and report a fall, such known devices and systems typically result in a high number of false-positive alerts being transmitted to the authorities if the user is unable to physically touch and respond to a fall alert on the device within a specified interval of time.

Finally, as to the other possible hazards that have led to the increase in unintentionally caused injuries and deaths of pets, infants, toddlers, kids, and adults, either there does not currently exist a corresponding system and method for mitigating the hazard and/or such known systems as may exist suffer from the same or similar defects to those present in the known device and systems for detecting geo-fence breaches and fall hazards.

In light of the foregoing, there is a clear need for improved hazard detection and mitigation devices, systems, and methods.

BRIEF DESCRIPTION OF THE DRAWINGS

FIG. 1B is a flow diagram of a method for operating a personal safety alert system according to disclosed embodiments;

FIG. 2 is a perspective view of a smart wearable device according to disclosed embodiments;

FIG. 3 is a top view of a smart wearable device according to disclosed embodiments;

FIG. 4 is a bottom view of a smart wearable device according to disclosed embodiments;

DETAILED DESCRIPTION OF THE INVENTION

Figure 1A:
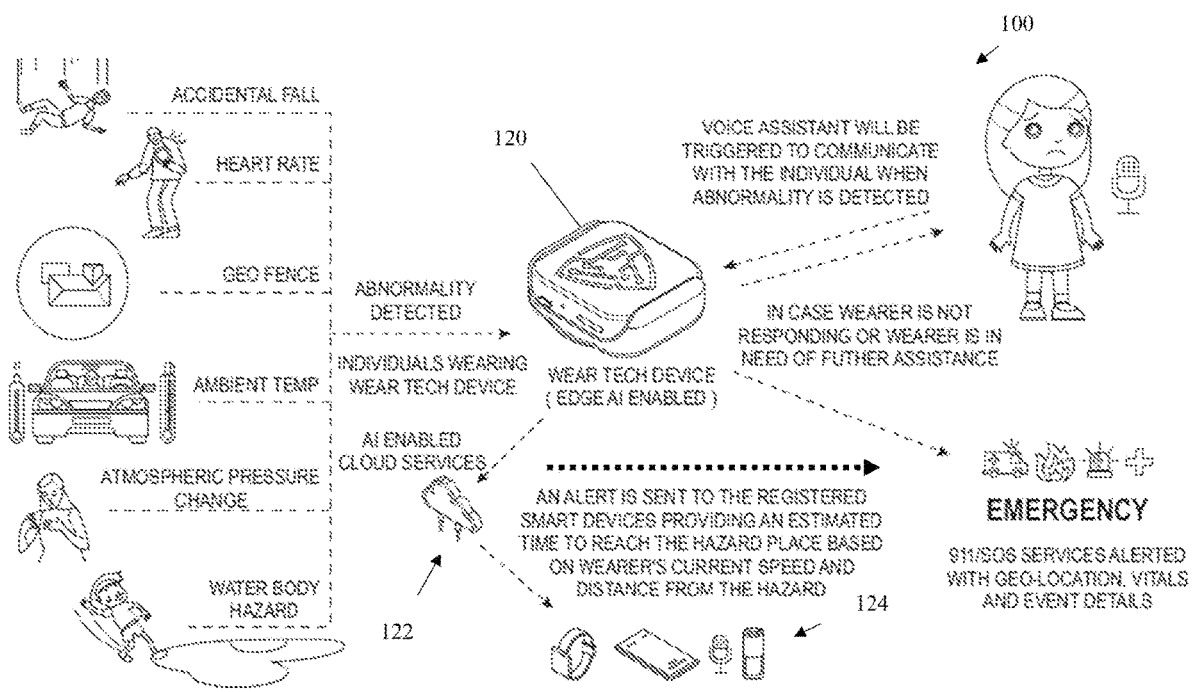
FIG. 1A is a schematic diagram of personal safety alert system according to disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

FIG. 1A shows a schematic diagram of a hazard detection and mitigation system 100 according to disclosed embodiments. As seen in FIG. 1A, the system 100 can include a wearable device 120 that can detect possible hazards or abnormalities being experienced by a user of the wearable device 120. As seen in FIG. 1A, the wearable device 120 can monitor various hazards or abnormalities including but not limited to a fall hazard, a heart rate hazard, a geo-fence breach, an ambient temperature hazard, an atmospheric pressure hazard, and a water body hazard, among others.

Furthermore, in some embodiments, the system 100 can include a cloud server 122 that is remote from the wearable device 120 and that can confirm or reject the hazard, monitor the hazard for positive or detrimental changes, solicit feedback from the user of the wearable device 120 to confirm or reject the hazard, and initiate various mitigation measures based on the current severity of the hazard. For example, in some embodiments, the cloud server 122 can send different alert levels to various notification devices 124 and, when the alert level is critical, can send a notification to an emergency provider.

In some embodiments, the various notification devices 124 can include a registered or primary device that serves as the initial delivery device for alert notifications, and various other secondary devices that receive an alert notification based on the severity of the alert and/or whether a user of the registered device acknowledged the alert notification within a predetermined time limit. For example, in some embodiments, the registered device can include a smartphone or similar device of a primary contact of the user of the wearable device 120 such as a parent or guardian, a spouse, friend, sibling, adult child, etc. Furthermore, the various other secondary devices in the notification devices 124 can include other smartphones or similar devices, various smart speakers, smart assistants, and the like. In some embodiments, one or more of the various other secondary devices in the notification devices 124 can be preconfigured in a memory of the wearable device 120 and/or the cloud server 122. Additionally or alternatively, in some embodiments, one or more of the various other secondary devices in the notification devices 124 can be selected from devices known to the registered device. For example, in some embodiments, the one or more of the various other secondary devices in the notification devices 124 can include smartphones or similar devices saved as contacts in a memory of the registered device or smart devices paired with or connected to the registered device via known wired and wireless methods.

FIG. 1B is a flow diagram of a method 102 for operating the system 100 according to disclosed embodiments. As seen in FIG. 1B, the method 102 can include the wearable device 120 monitoring for one or more abnormal conditions, as in 104. In some embodiments, the wearable device 120 can employ one or more on-device trained artificial intelligence (AI) processes to detect the presence of the one or more abnormal conditions based on data from a plurality of sensors 126 (see FIG. 4 and FIG. 9) electrically connected to the wearable device 120. Additionally or alternatively, in some embodiments, the wearable device 120 can detect a particular abnormal condition from a portion of the data from the plurality of sensors 120 when a value of one of the plurality of sensors 120 is outside a preconfigured threshold.

In some embodiments, the method 102 can include the wearable device 120 detecting the abnormal condition, the wearable device 120 forwarding the data from each of the plurality of sensors 126 to the cloud server 122, and the wearable device 120 or the cloud server 122 transmitting a level one notification (e.g. an information alert) to the registered device of the notification devices 124 documenting the abnormal condition, as in 106. In some embodiments, the method 102 can include the cloud server 122 soliciting the data in response to receiving an indication of the abnormal condition from the wearable device 120.

Various embodiments for the abnormal condition monitored by the wearable device 120 are contemplated. For example, in some embodiments the abnormal condition can include one or more of a water-based hazard, an ambient temperature hazard, a fall hazard, and/or a geo-fence breach. Furthermore, in some embodiments, the one of the plurality of sensors 126 that detect the abnormal condition can be different depending on the specific abnormal condition. For example, when the abnormal condition includes the water-based hazard, the one of the plurality of sensors 126 can include a water contact sensor, a humidity sensor, and/or an atmospheric pressure sensor; when the abnormal condition includes the ambient temperature hazard, the one of the plurality of sensors 126 can include an ambient temperature sensor; when the abnormal condition includes the fall hazard, the one of the plurality of sensors 126 can include an impact sensor and/or an accelerometer; and, when the abnormal condition includes the geo-fence breach, the one of the plurality of sensors 126 can include a location monitoring module.

After the wearable device 120 detects the abnormal condition, the method 102 can include activating a prediction subsystem of the cloud server 122, as in 108. In some embodiments, the prediction subsystem can include the cloud server 122 determining a current condition of the user of the wearable device 120 using the data from the plurality of sensors 126 and then monitoring the current condition for a change. In some embodiments, the method 102 can include the cloud server 122 processing the data with an AI model to determine the current condition of the user of the wearable device 120 and/or to monitor the current condition for the change. In these embodiments, the AI model can be trained using historical data from the wearable device 120, historical data from another device, and/or manufactured data which include first known values corresponding to the abnormal condition being experienced and second known values corresponding to the abnormal condition not being experienced. In some embodiments, the method 102 can include the cloud server 122 selecting the AI model from one of a plurality of AI models based on the abnormal condition detected by the wearable device 120. In these embodiments, each of the plurality of artificial intelligence models is trained using historical data from the wearable device 120, historical data from another device, and/or manufactured data which include first known values corresponding to a different respective abnormal condition being experienced and second known values corresponding to the different respective abnormal condition not being experienced.

Parallel with or independently of activating the prediction subsystem of the cloud server 122, as in 108, the method 102 can include the cloud server 122 activating a protection subsystem or mechanism when the wearable device 120 detects the abnormal condition, as in 110. In some embodiments, activating the prediction subsystem of the cloud server 122 can include the cloud server 122 soliciting feedback from the wearable device 120 and then the cloud server 122 determining the current condition of the user of the wearable device 120 using the data and the feedback. For example, in some embodiments, the method 102 can include the cloud server 122 determining that the current condition indicates that the user is not experiencing the abnormal condition when the feedback is positive and the cloud server 122 receives the feedback within a predefined cutoff time and the cloud server determining that the current condition indicates that the user is experiencing the abnormal condition when the feedback is negative and the cloud server receives the feedback within the predefined cutoff time. Furthermore, in some embodiments, when the cloud server 122 fails to receive the feedback before the predefined cutoff time, the method 102 can include the cloud server 122 including the failure to receive the feedback in the data used by the prediction subsystem for determining the current condition and monitoring the current condition for the change.

Various embodiments for the feedback solicited by the cloud server 122 are contemplated. For example, in some embodiments, the feedback can include one or more of user input received on the wearable device 120, an audio signal received by the wearable device 120, an audio signal received by a user device located proximate to the wearable device 120, and/or a preconfigured movement of the wearable device 120. Furthermore, as seen in FIG. 1B, in some embodiments, the method 102 can include the cloud server 122 activating an AI audio bot as described herein to interact with the user of the wearable device 120 to solicit the feedback. In some embodiments, the AI audio bot is executed on the cloud server 120. However, embodiments where the AI audio bot is exclusively or partially executed on the wearable device 120 are also contemplated.

As seen in FIG. 1B, the method 102 can include the cloud server 122 transmitting one or more of a level two notification (e.g. an alert level serious) to the registered device, a level three notification (e.g. an alert level critical) to the registered device and/or the secondary devices, and/or a level four notification (e.g. a high or catastrophic level alert) or to the registered device, the related devices, and an emergency response provider, as in 108, 110, and 112 based on the determinations of the prediction subsystem and/or the protection subsystem. In some embodiments, the method 102 can include the cloud server 122 transmitting a higher level alert to a different one of the notification devices when a response is not received to an earlier alert from, for example, the registered device. In some embodiments, the cloud server 122 can identify the correct emergency response provider to transmit the level four notification to based on a current location of the wearable device 120 and/or the specific abnormal condition being experienced by the user of the wearable device 120. Furthermore, in some embodiments, when the determinations of the prediction subsystem and/or the protection subsystem include situations where the current condition and/or the change in the current condition indicates the user is not experiencing the abnormal condition, the method 102 can include the cloud server 122 transmitting an all-clear notification to the registered device documenting the current condition. It should be noted that additional embodiments are contemplated where one or more of the steps of the method 102 described above as being carried out by the cloud server 122 are instead carried out by the wearable device 120 and one or more of the steps of the method 102 described above as being carried out by the wearable device 120 are instead carried out by the cloud server 122.

Additionally or alternatively, in some embodiments, any of the level one, two, three, or four notifications can include additional information besides the current condition of the user of the wearable device 120. For example, in some embodiments the additional information can include the location of the wearable device 120, key health metrics of the user of the wearable device 120 such as body temperature, heart rate etc., and other useful information as would be known to persons having ordinary skill in the art.

FIGS. 2-8 show various views of the wearable device 120 according to disclosed embodiments. In particular, FIG. 2 shows a perspective view of the wearable device 120 and FIG. 3 shows a top view of the wearable device 120. As seen in FIGS. 2 and 3, in some embodiments, the wearable device 120 can include a plurality of indicator or status lights 125 that are recessed into a top surface of the wearable device 120. In some embodiments, the indicator or status lights can include light emitting diodes (LEDs) and/or other light sources such as known in the art. FIG. 4 shows a bottom view of the wearable device 120. In some embodiments, some of the plurality of sensors 126 (see FIG. 9) can be positioned on the bottom of the wearable device 120 and can include body contact sensors that measure one or more user metrics of the user of the wearable device 120. In some embodiments the one or more user metrics can include the heart rate, blood oxygen level, and/or body temperature of the user.

Figure 5:
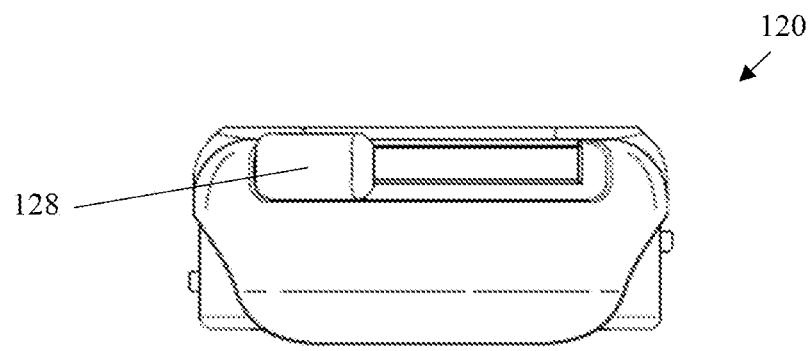
FIGS. 5-7 are side views of a smart wearable device according to disclosed embodiments.
Figure 6:
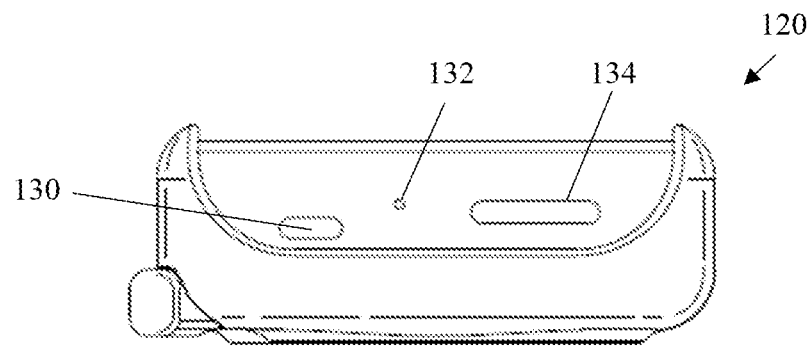
Figure 7:
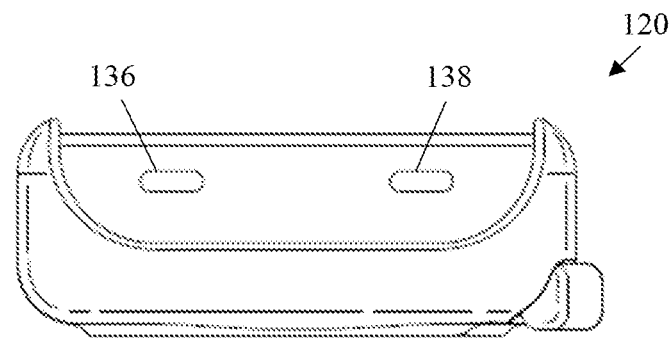

FIGS. 5-7 show side views of the wearable device 120 according to disclosed embodiments. As seen in FIGS. 5-7, the wearable device 120 can include a lever 128 for releasing the wearable device 120 from clothing or another related accessory and a plurality of user interface elements or buttons for controlling the wearable device 120 such as and buttons 130, 134, 136, and 138. Furthermore, as seen in FIG. 6, in some embodiments, the wearable device 120 can include a microphone 132. In some embodiments, the microphone 132 can be used in conjunction with the AI audio bot to solicit the feedback from the user of the wearable device 120 as described herein.

Figure 8:
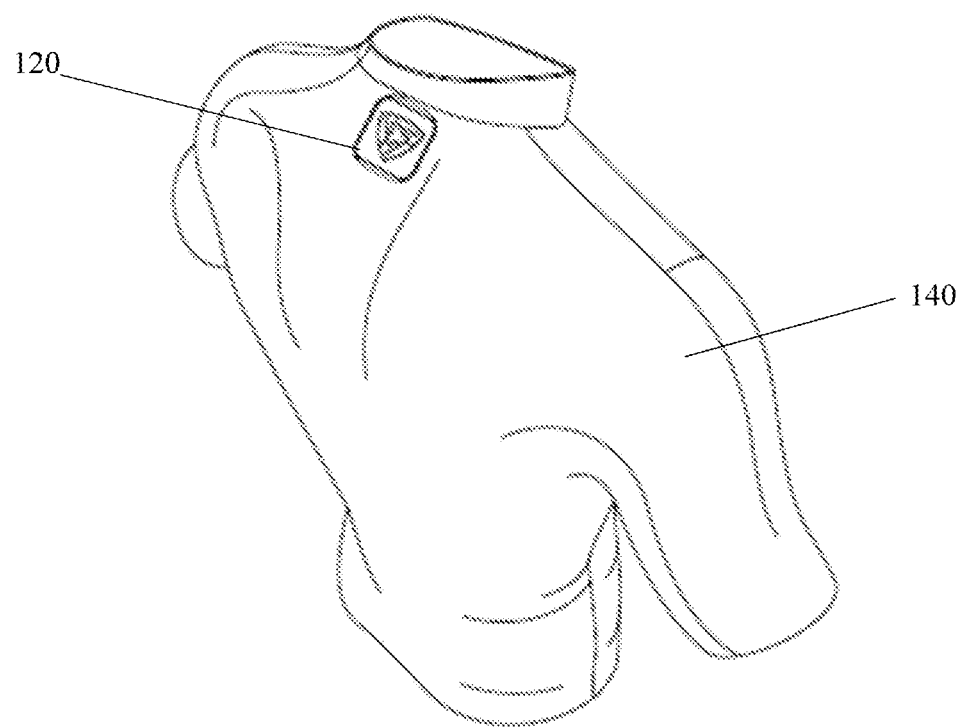
FIG. 8 shows a smart wearable device integrated into a clothing system according to disclosed embodiments.

FIG. 8 shows the wearable device 120 integrated into a clothing system 140 according to disclosed embodiments. In some embodiments, one or more of the plurality of sensors 126 can be integrated into the clothing system 140 and electrically connected to the wearable device 120. Additionally or alternatively, in some embodiments, the wearable device 120 can be worn on the arm, wrist, ring, etc.

Figure 9:
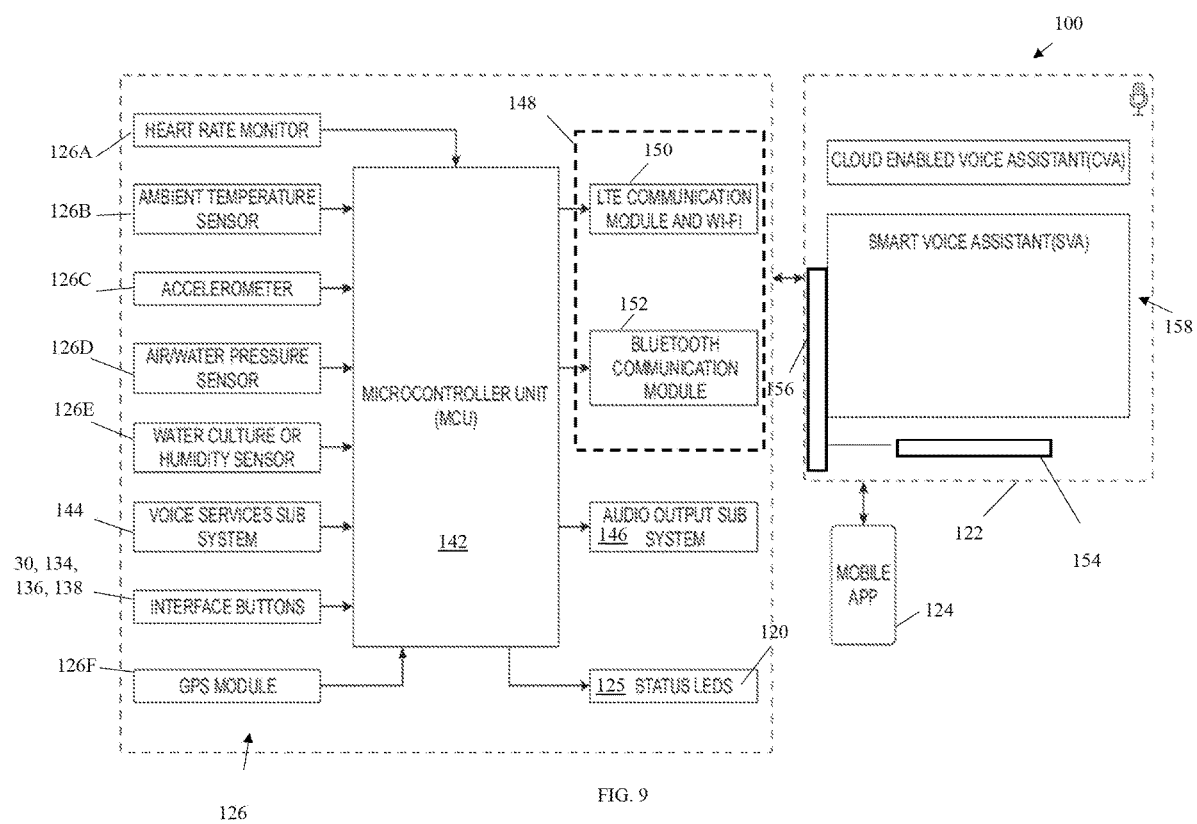
FIG. 9 is a block diagram of personal safety alert system according to disclosed embodiments.

FIG. 9 is a block diagram of the hazard detection and mitigation system 100 and the components thereof according to disclosed embodiments. As seen in FIG. 9, in some embodiments, the plurality of sensors 126 can include at least a heart rate monitor 126A, an ambient temperature sensor 126B, an accelerometer 126C, an air/water pressure sensor 126D, a water culture or humidity sensor 126E, and a location sensor 126F such as a global positioning system (GPS) module. As seen in FIG. 9, in some embodiments, each of the plurality of sensors 126 can be electrically coupled to a programmable processor or microcontroller unit 142 of the wearable device 120. In some embodiments, a voice services subsystem 144 that includes the microphone 132; the user interface elements 130, 134, 136, and 138; the indicator lights 125; an audio output subsystem 146; and a communication interface 148 can be electrically coupled to the programmable processor 142. Various other sensors known to person having ordinary skill in the art such as an oxygen sensor or a camera can be included among the plurality of sensors 126. In operation, the programmable processor 142 can monitor the data from the plurality of sensors 126 to detect the abnormal condition from the at least a portion of the data and, when the programmable processor 142 detects the abnormal condition, the programmable processor 142 can transmit an indication of the abnormal condition and the data to a cloud server 122 via the communication interface 148.

As seen in FIG. 9, in some embodiments, the communication interface 148 can include an LTE Cellular data and WiFi modules or chipsets 150 and a Bluetooth module or chipset 152 for communicating with the cloud server 122, the notification devices 124, and/or other devices as would be understood in the art. Various other wired and wireless communication channels as understood in the art are also contemplated. For example, in some embodiments, the communication interface 148 can include a LoRaWAN module or chipset.

As seen in FIG. 9, in some embodiments, the cloud server 122 can include a second communication interface 156 for interfacing with the communication interface 148 of the wearable device 120 and the notification devices 124. In some embodiments, the cloud server 122 can include second programmable processor 154 coupled to the second communication interface 156 and configured to carry out one or more of the methods described herein. Furthermore, in some embodiments, the cloud server 158 can include a memory device 158 for storing the AI audio bot, the plurality of AI modules, and/or other data and executable codes used by the cloud server 122 to carry out one or more of the methods described herein.

Various embodiments for the construction of the wearable device 120 are contemplated. For example, various printed circuit board (PCB) configurations with one or more layers for interconnecting the components of the wearable device 120 are contemplated. In some embodiments, some of the components of the wearable device 120 can be interconnected on a multi-layer rigid PCB that is coupled via a flex connector to a second sensor board housing one or more of the plurality of sensors 126. In some embodiments the second sensor board can be flexible. For example, in some embodiments, the communication interface 148, location sensor 126F, the accelerometer 126C, the air/water pressure sensor 126D, the water culture or humidity sensor 126E, and the ambient temperature sensor 126B, can be interconnected on the multi-layer rigid PCB and the heart rate monitor 126A and an oxygen sensor can be disposed on the sensor board coupled to the multi-layer rigid PCB by the flex cable. In some embodiments, the programmable processor or microcontroller unit 142 can also be integrated into the multi-layer rigid PCB. Additional and alternative interconnection options known to persons of ordinary skill in the art are also contemplated. In some embodiments, the sensor board and the multi-layer PCB can be enclosed in a housing. Electronic circuitries are programmed with machine learning and artificial intelligence algorithms to provide contextual, intelligent, and timely alerts.

In some embodiments, the wearable device 120 can include one or more custom-designed antennas electrically coupled to the communication interface 148, the location sensor 126F, and/or other components of the wearable device 120. Various configurations for the antennas are contemplated including, but not limited to, having the antennas being embedded into the housing or an enclosure shell or a wristband.

FIGS. 10-21 show flow diagrams for various methods and sub-processes executed by the wearable device 120 and/or the cloud server 122 to detect and mitigate one or more hazards potentially experienceable by the user of the wearable device 120.

Figure 10:
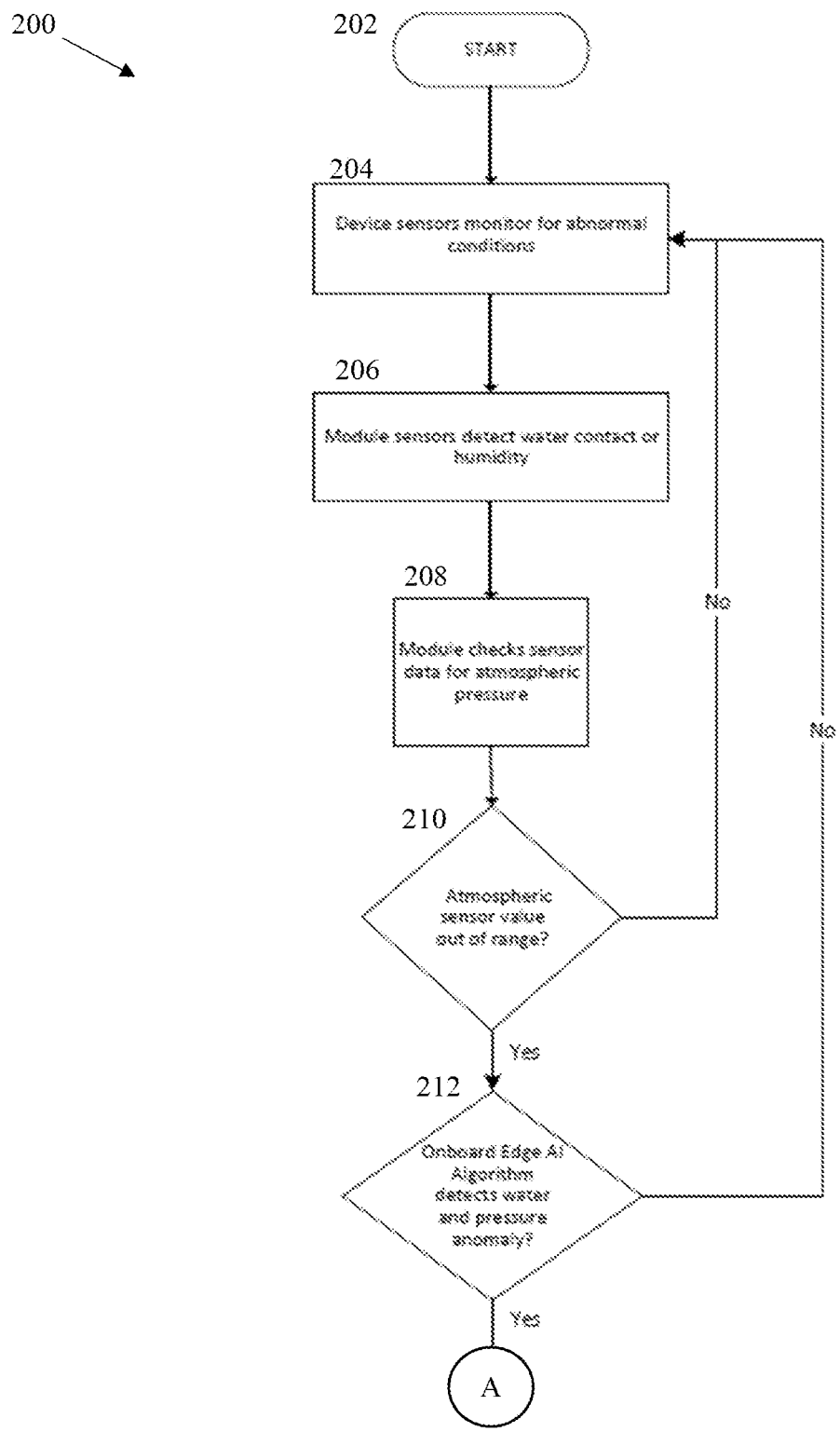
FIGS. 10-11 are a flow diagram for a water-based hazard detection and alert method according to disclosed embodiments.
Figure 11:
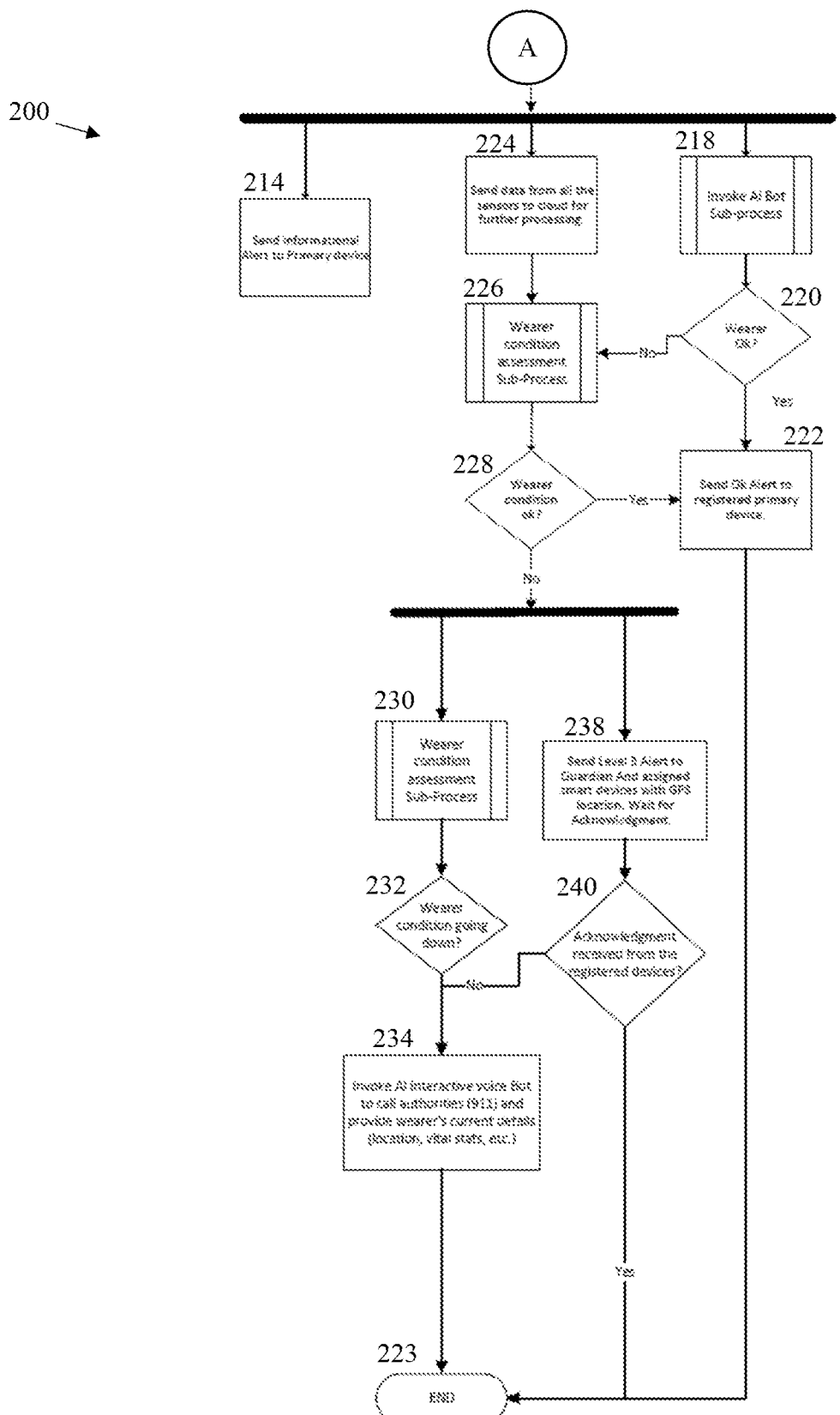

FIGS. 10-11 show a flow diagram for a water based hazard detection method 200 according to disclosed embodiments. In particular, FIG. 10 shows portions of the method 200 carried out by the wearable device 120 and includes starting the method 200 by having the wearable device 120 monitor the plurality of sensors 126 for an abnormal condition such as a water/pressure base anomaly, as in 202 and 204. Then, the method 200 can include the wearable device 120 detecting water contact or a humidity increase using for example the water culture or humidity sensor 126E, as in 206. Next, the wearable device 120 can check a value of the air water pressure sensor 126D and determine whether the value is outside a preconfigured range, as in 208 and 210. When, the value fails to be outside the preconfigured range, the method 200 can include the cloud server 122 continuing to perform steps 204 through 210. However, when the value is outside the preconfigured range, the method 200 can include the wearable device 120 processing the values from at least the water culture or humidity sensor 126E and the air water pressure sensor 126D with an onboard AI process to determine whether a water/pressure based anomaly is likely occurring to the user of the wearable device 120. When, the water/pressure based anomaly is unlikely to be occurring, the method 200 can include the cloud server 122 continuing to perform steps 204 through 210. However, when the water/pressure based anomaly is likely to be occurring, the method 200 can include the cloud server 122 transmitting an indication of the water/pressure based anomaly to the cloud server 122.

Turning now to FIG. 11 the portions of the method 200 carried out by the cloud server 122 are shown. As seen in FIG. 11, after receiving the indication of the water/pressure based anomaly from the wearable device 120, the method 200 can include the cloud server 122 transmitting a level one or informational alert to the registered device in the notification devices 124 to inform the notification devices 124 of the water/pressure based anomaly, as in 214. In parallel with step 214, the method 200 can include the cloud server 122 invoking the AI bot process and using its output to determine whether the user of the wearable device 120 is ok or not (e.g. to determine whether the user of the wearable device 120 is experiencing a water/pressure based hazard), as in 218 and 220. When the output of the AI bot process indicates that the user of the wearable device 120 is ok, the method 200 can include the cloud server 122 transmitting an all-clear alert or notification to the notification devices 124 and then ending the method 200, as in 222 and 223.

Furthermore, in parallel with steps 214 and 218, the method 200 can include the cloud server 122 receiving, from the wearable device 120, all the data from the plurality of sensors 126, as in 224. In some embodiments, the method 200 can include the cloud server 122 soliciting or requesting all of the data from the plurality of sensors 126. After receiving all of the data from the plurality of sensors 126, the method 200 can include the cloud server 122 invoking a wearer condition assessment sub-process to parse the data from the plurality of sensors 126, as in 226. In some embodiments, the method 200 can include the cloud server 122 including a negative output from the AI bot process in the data parsed by the wearer condition assessment sub-process. Next, the method 200 can use the output of the wearer condition assessment sub-process to determine whether the user of the wearable device 120 is ok or not (e.g. to determine whether the user of the wearable device 120 is experiencing the water/pressure based hazard). When the output of the wearer condition assessment sub-process indicates that the user of the wearable device 120 is ok, the method 200 can include the cloud server 122 transmitting the all-clear alert or notification to the notification devices 124 and then ending the method 200, as in 222 and 223.

However, when the output of the wearer condition assessment sub-process indicates that the user of the wearable device 120 is not ok (e.g. the user of the wearable device 120 is likely experiencing the water/pressure based hazard), the method 200 can include the cloud server 122 running the wearer condition assessment sub-process to monitor the current condition of the user of the wearable device 120 for any change based on changes in the data from the plurality of sensors 126 (e.g. to determine whether the water/pressure based hazard becomes more or less severe), as in 230 and 232. When the wearer condition assessment sub-process indicates that the current condition of the user of the wearable device 120 is going down or deteriorating, the method 200 can include the cloud server 122 transmitting a level four alert or notification to the notification devices 124 and/or the relevant emergency services provider informing both of the deteriorating water/pressure based hazard being experienced by the user of the wearable device 120 and then ending the method 200, as in 234 and 223. In some embodiments, the method 200 can include the cloud server 122 invoking the AI bot process to contact the relevant emergency service providers.

Additionally, when the output of the wearer condition assessment sub-process from step 228 indicates that the user of the wearable device 120 is not ok, the method 200 can include the cloud server 122 sending a level 3 or critical alert to the notification devices 124 documenting the current state of the water/pressure based hazard being experienced by the user of the wearable device 120 and determining whether an acknowledgment was received from one or more of the notification devices 124, as in 238 and 240. When no acknowledgment is received from the notification devices 124, the method 200 can include the cloud server 122 transmitting the level four alert or notification to the notification devices 124 and/or the relevant emergency services provider and ending the method 200, as in 234 and 223. In some embodiments, when an acknowledgment is received from the notification devices 124, the method 200 can include the cloud server 122 ending the method 200, as in 223. In some embodiments, the method 200 can include the cloud server 122 continuing to monitor the current condition of the user of wearable device 120 for a change in the severity of the water/pressure based hazard as in steps 230-234 even after the cloud server 122 receives an acknowledgment from one of the notification devices 124. For example, in some embodiments, the method 200 can include the cloud server 122 monitoring the current condition of the user of wearable device for a change in the severity of the water/pressure based hazard as in steps 230-234 until the current values of the plurality of sensors 126 as parsed by the wearer condition assessment sub-process indicate that the user of the wearable device 120 is no longer experiencing the water/pressure based hazard.

It should be noted that additional embodiments are contemplated where one or more of the steps of the method 200 described above as being carried out by the cloud server 122 are instead carried out by the wearable device 120 and one or more of the steps of the method 200 described above as being carried out by the wearable device 120 are instead carried out by the cloud server 122. For example, in some embodiments one or more of the steps shown in and described with respect to FIG. 10 can be carried out by the cloud server 122 rather than the wearable device 120 and one or more of the steps shown in and described with respect to FIG. 11 can be carried out on the wearable device 120 rather than the cloud server 122.

Figure 12:
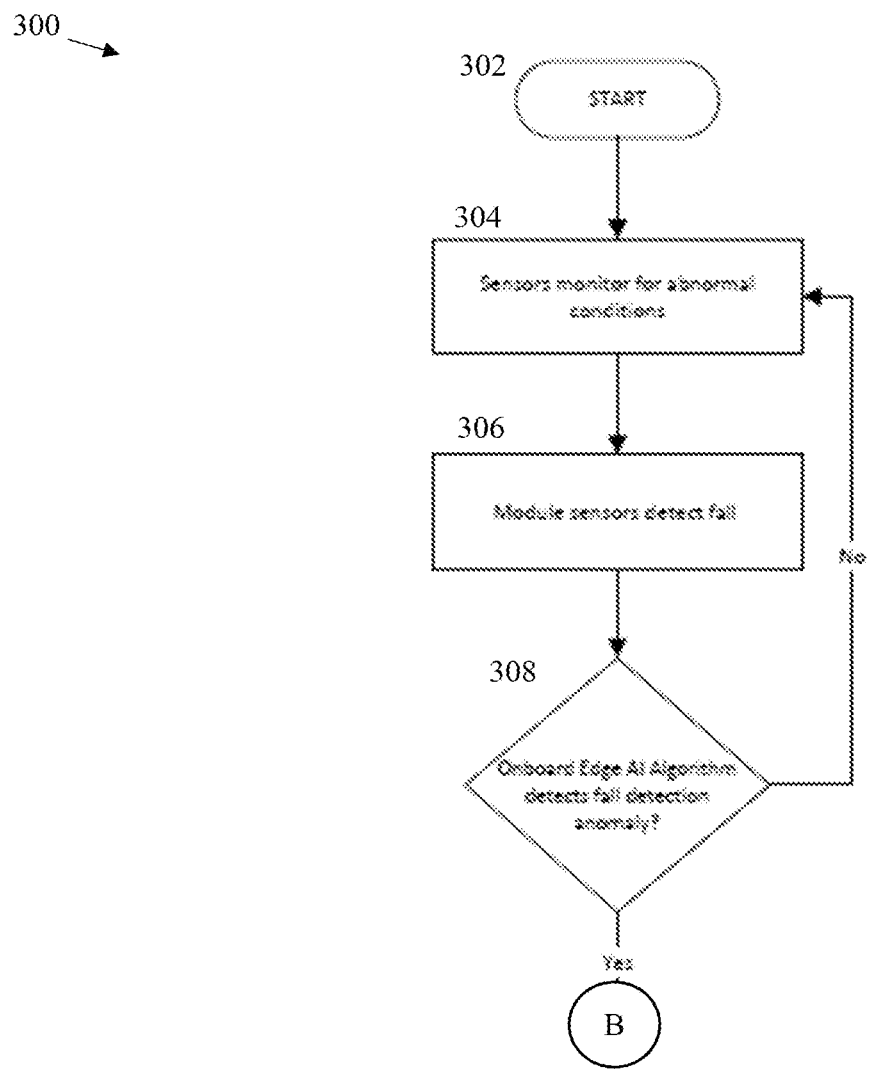
FIGS. 12-13 are a flow diagram for a fall hazard detection and alert method according to disclosed embodiments.
Figure 13:
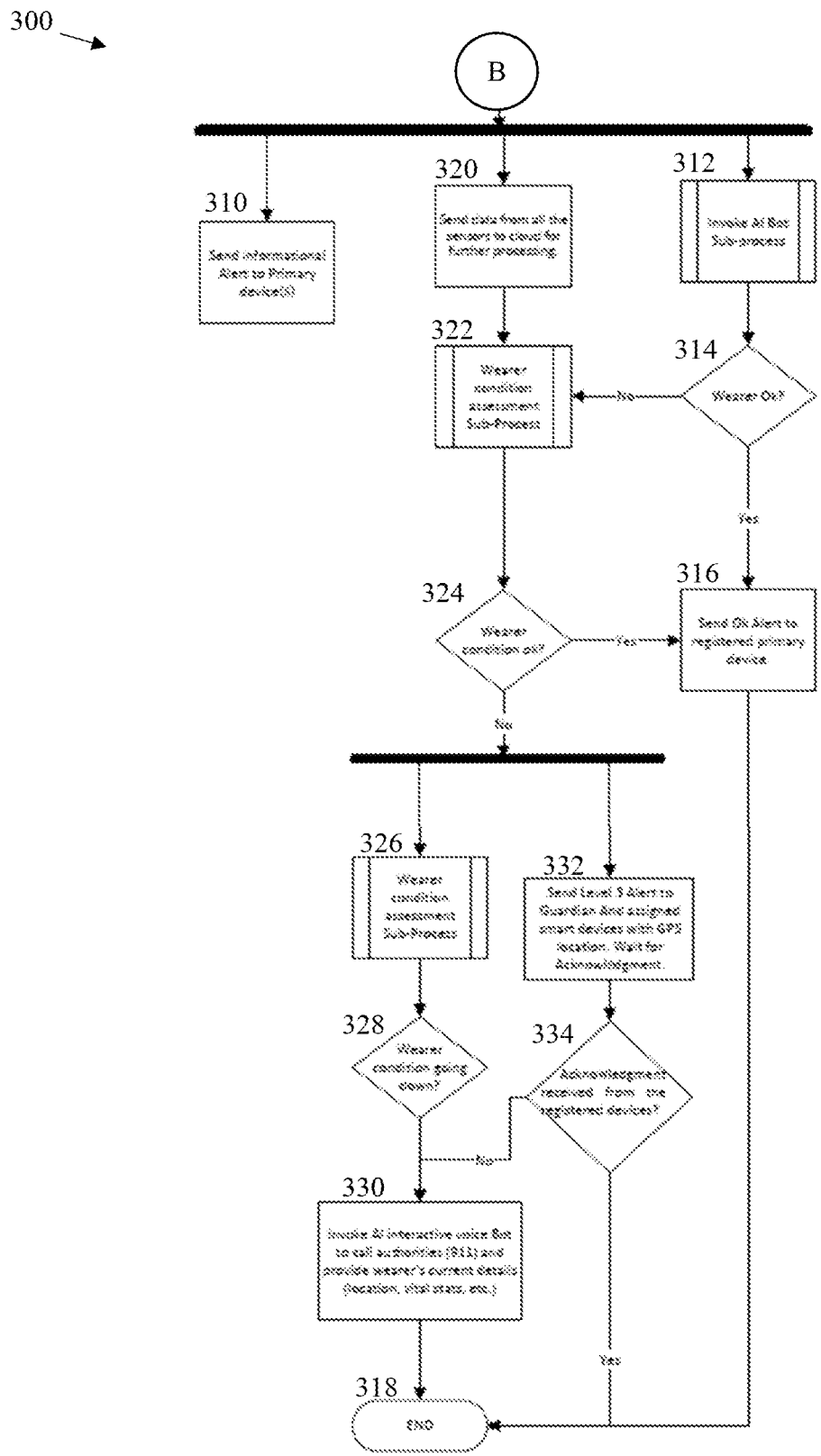

FIGS. 12-13 show a flow diagram for a fall based hazard detection method 300 according to disclosed embodiments. In particular, FIG. 12 shows portions of the method 300 carried out by the wearable device 120 and includes starting the method 300 by having the wearable device 120 monitor the plurality of sensors 126 for an abnormal condition such as a fall based anomaly, as in 302 and 304. Then, the method 300 can include the wearable device 120 detecting a fall by for example detecting a sudden change in the value of the accelerometer sensor 126C, as in 306. Next, the method 300 can include the wearable device 120 processing the values from at least the accelerometer sensor 126C with the onboard AI process to determine whether a fall based anomaly is likely occurring to the user of the wearable device 120. When, the fall based anomaly is unlikely to be occurring, the method 300 can include the cloud server 122 continuing to perform steps 304 through 308. However, when the fall based anomaly is likely to be occurring, the method 300 can include the cloud server 122 transmitting an indication of the fall based anomaly to the cloud server 122.

Turning now to FIG. 13 the portions of the method 300 carried out by the cloud server 122 are shown. As seen in FIG. 13, after receiving the indication of the fall based anomaly from the wearable device 120, the method 300 can include the cloud server 122 transmitting a level one or informational alert to the registered device in the notification devices 124 to inform the notification devices 124 of the fall based anomaly, as in 310. In parallel with step 310, the method 300 can include the cloud server 122 invoking the AI bot process and using its output to determine whether the user of the wearable device 120 is ok or not (e.g. to determine whether the user of the wearable device 120 is experiencing a fall based hazard), as in 312 and 314. When the output of the AI bot process indicates that the user of the wearable device 120 is ok, the method 300 can include the cloud server 122 transmitting the all-clear alert or notification to the notification devices 124 and then ending the method 300, as in 316 and 318.

Furthermore, in parallel with steps 310 and 312, the method 300 can include the cloud server 122 receiving, from the wearable device 120, all the data from the plurality of sensors 126, as in 320. In some embodiments, the method 300 can include the cloud server 122 soliciting or requesting all of the data from the plurality of sensors 126. After receiving all of the data from the plurality of sensors 126, the method 300 can include the cloud server 122 invoking the wearer condition assessment sub-process to parse the data from the plurality of sensors 126, as in 322. In some embodiments, the method 300 can include the cloud server 122 including a negative output from the AI bot process in the data parsed by the wearer condition assessment sub-process. Next, the method 300 can use the output of the wearer condition assessment sub-process to determine whether the user of the wearable device 120 is ok or not (e.g.

to determine whether the user of the wearable device 120 is experiencing the fall based hazard). When the output of the wearer condition assessment sub-process indicates that the user of the wearable device 120 is ok, the method 300 can include the cloud server 122 transmitting the all-clear alert or notification to the notification devices 124 and then ending the method 300, as in 316 and 318.

However, when the output of the wearer condition assessment sub-process indicates that the user of the wearable device 120 is not ok (e.g. the user of the wearable device 120 is likely experiencing the fall based hazard), the method 300 can include the cloud server 122 running the wearer condition assessment sub-process to monitor the current condition of the user of the wearable device 120 for any change based on changes in the data from the plurality of sensors 126 (e.g. to determine whether the fall based hazard becomes more or less severe), as in 326 and 328. When the wearer condition assessment sub-process indicates that the current condition of the user of the wearable device 120 is going down or deteriorating, the method 300 can include the cloud server 122 transmitting the level four alert or notification to the notification devices 124 and/or the relevant emergency services provider informing both of the deteriorating fall based hazard being experienced by the user of the wearable device 120 and then ending the method 300, as in 330 and 318. In some embodiments, the method 300 can include the cloud server 122 invoking the AI bot process to contact the relevant emergency service providers.

Additionally, when the output of the wearer condition assessment sub-process from step 324 indicates that the user of the wearable device 120 is not ok, the method 300 can include the cloud server 122 sending the level 3 alert to the notification devices 124 documenting the current state of the fall based hazard being experienced by the user of the wearable device 120 and determining whether an acknowledgment was received from one or more of the notification devices 124, as in 332 and 334. When no acknowledgment is received from the notification devices 124, the method 300 can include the cloud server 122 transmitting the level four alert or notification to the notification devices 124 and/or the relevant emergency services provider and then ending the method 300, as in 330 and 318. In some embodiments, when an acknowledgment is received from the notification devices 124, the method 300 can include the cloud server 122 ending the method 300, as in 318. In some embodiments, the method 300 can include the cloud server 122 continuing to monitor the current condition of the user of wearable device for a change in the severity of the fall based hazard as in steps 326-330 even after the cloud server 122 receives an acknowledgment from one of the notification devices 124. For example, in some embodiments, the method 300 can include the cloud server 122 monitoring the current condition of the user of wearable device for a change in the severity of the fall based hazard as in steps 326-330 until the current values of the plurality of sensors 126 as parsed by the wearer condition assessment sub-process indicating that the user of the wearable device 120 is no longer experiencing the fall based hazard.

It should be noted that additional embodiments are contemplated where one or more of the steps of the method 300 described above as being carried out by the cloud server 122 are instead carried out by the wearable device 120 and one or more of the steps of the method 300 described above as being carried out by the wearable device 120 are instead carried out by the cloud server 122. For example, in some embodiments one or more of the steps shown in and described with respect to FIG. 12 can be carried out by the cloud server 122 rather than the wearable device 120 and one or more of the steps shown in and described with respect to FIG. 13 can be carried out on the wearable device 120 rather than the cloud server 122.

Figure 14:
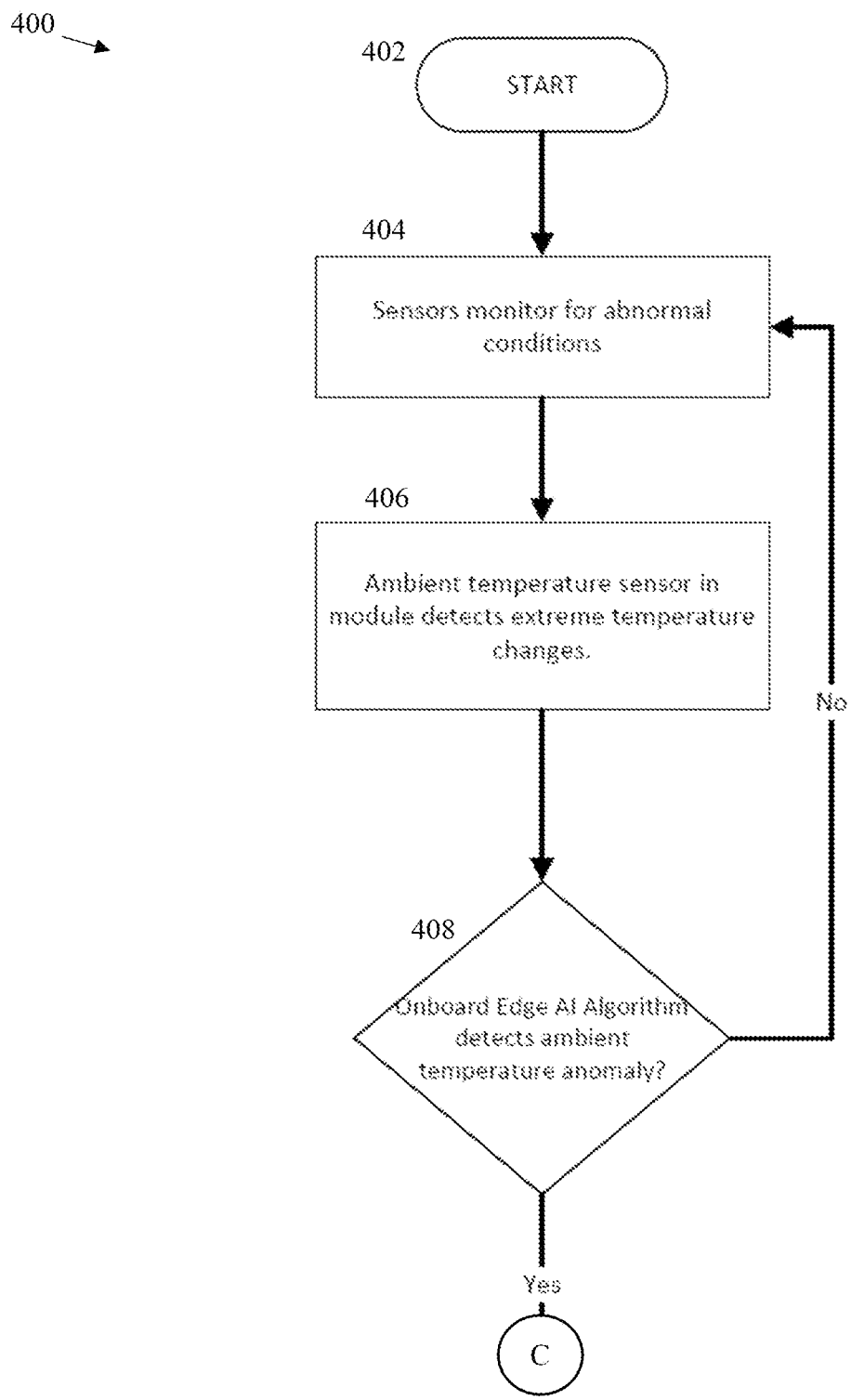
FIGS. 14-15 are a flow diagram for an ambient temperature hazard detection and alert method according to disclosed embodiments.
Figure 15:
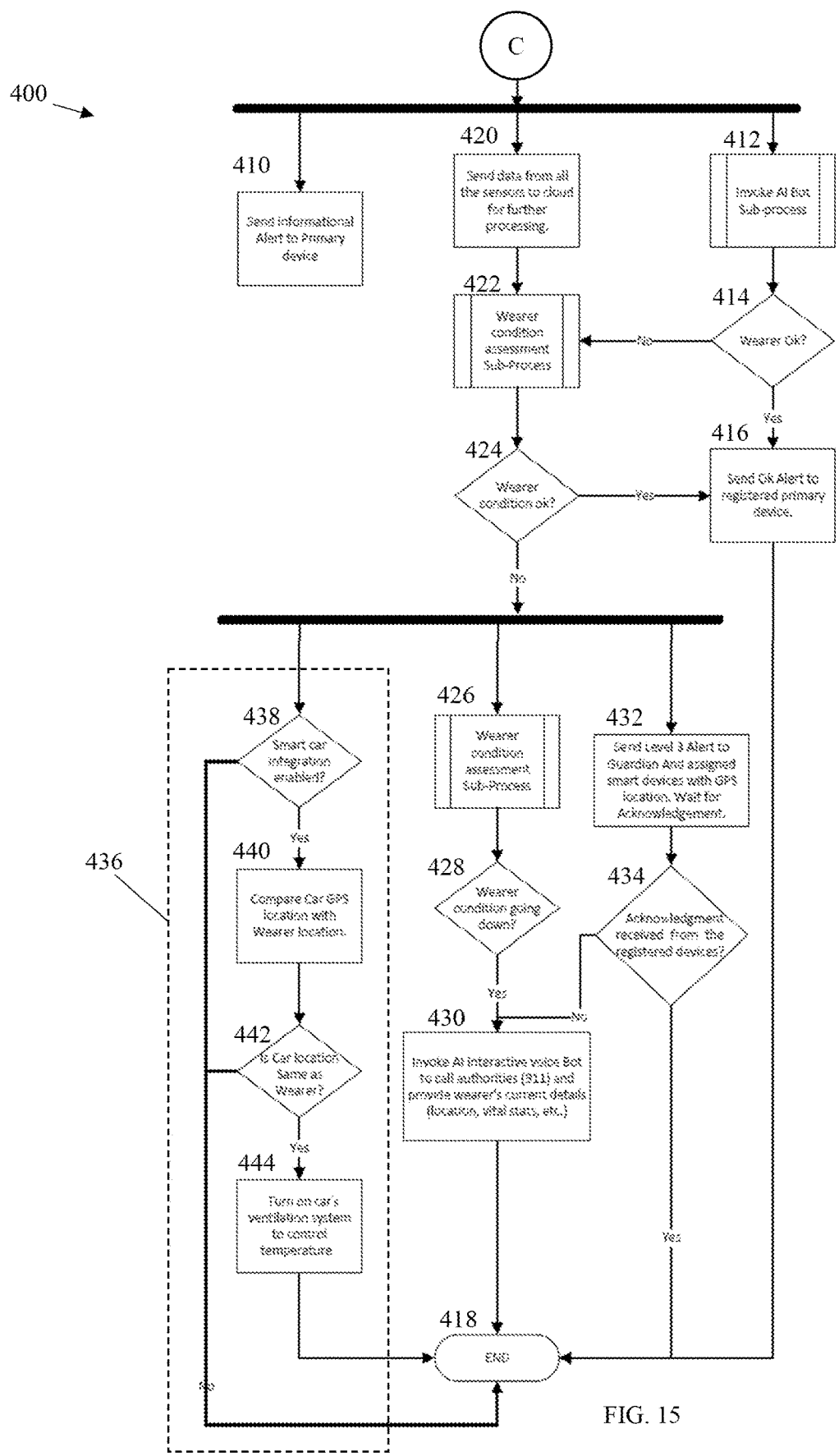

FIGS. 14-15 show a flow diagram for an ambient temperature based hazard detection method 400 according to disclosed embodiments. In particular, FIG. 14 shows portions of the method 400 carried out by the wearable device 120 and includes starting the method 400 by having the wearable device 120 monitor the plurality of sensors 126 for an abnormal condition such as an ambient temperature based anomaly, as in 402 and 404. Then, the method 400 can include the wearable device 120 detecting an ambient temperature issue by for example detecting a sudden change in the value of the ambient temperature sensor 126B, as in 406. Next, the method 400 can include the wearable device 120 processing the values from at least the ambient temperature sensor 126B with the onboard AI process to determine whether an ambient temperature based anomaly is likely occurring to the user of the wearable device 120, as in 408. When, the ambient temperature based anomaly is unlikely to be occurring, the method 400 can include the cloud server 122 continuing to perform steps 404 through 408. However, when the ambient temperature based anomaly is likely to be occurring, the method 400 can include the cloud server 122 transmitting an indication of the ambient temperature based anomaly to the cloud server 122.

Turning now to FIG. 15 the portions of the method 400 carried out by the cloud server 122 are shown. As seen in FIG. 15, after receiving the indication of the ambient temperature based anomaly from the wearable device 120, the method 400 can include the cloud server 122 transmitting the level one or informational alert to the registered device in the notification devices 124 to inform the notification devices 124 of the ambient temperature based anomaly, as in 410. In parallel with step 410, the method 400 can include the cloud server 122 invoking the AI bot process and using its output to determine whether the user of the wearable device 120 is ok or not (e.g. to determine whether the user of the wearable device 120 is experiencing the ambient temperature based hazard), as in 412 and 414. When the output of the AI bot process indicates that the user of the wearable device 120 is ok, the method 400 can include the cloud server 122 transmitting the all-clear alert or notification to the notification devices 124 and then ending the method 400, as in 416 and 418.

Furthermore, in parallel with steps 410 and 412, the method 400 can include the cloud server 122 receiving, from the wearable device 120, all the data from the plurality of sensors 126, as in 420. In some embodiments, the method 400 can include the cloud server 122 soliciting or requesting all of the data from the plurality of sensors 126. After receiving all of the data from the plurality of sensors 126, the method 400 can include the cloud server 122 invoking the wearer condition assessment sub-process to parse the data from the plurality of sensors 126, as in 422. In some embodiments, the method 400 can include the cloud server 122 including a negative output from the AI bot process in the data parsed by the wearer condition assessment sub-process. Next, the method 400 can use the output of the wearer condition assessment sub-process to determine whether the user of the wearable device 120 is ok or not (e.g. to determine whether the user of the wearable device 120 is experiencing the ambient temperature based hazard), as in 424. When the output of the wearer condition assessment sub-process indicates that the user of the wearable device 120 is ok, the method 400 can include the cloud server 122 transmitting the all-clear alert or notification to the notification devices 124 and then ending the method 400, as in 416 and 418.

However, when the output of the wearer condition assessment sub-process indicates that the user of the wearable device 120 is not ok (e.g. the user of the wearable device 120 is likely experiencing the ambient temperature based hazard), the method 400 can include the cloud server 122 running the wearer condition assessment sub-process to monitor the current condition of the user of the wearable device 120 for any change based on changes in the data from the plurality of sensors 126 (e.g. to determine whether the ambient temperature based hazard becomes more or less severe), as in 426 and 428. When the wearer condition assessment sub-process indicates that the current condition of the user of the wearable device 120 is going down or deteriorating, the method 400 can include transmitting the level four alert or notification to the notification devices 124 and/or the relevant emergency services provider informing both of the deteriorating ambient temperature based hazard being experienced by the user of the wearable device 120 and then ending the method 400, as in 430 and 418. In some embodiments, the method 400 can include invoking the AI bot process to contact the relevant emergency service providers.

Additionally, when the output of the wearer condition assessment sub-process from step 424 indicates that the user of the wearable device 120 is not ok, the method 400 can include the cloud server 122 sending the level 3 alert to the notification devices 124 documenting the current state of the ambient temperature based hazard being experienced by the user of the wearable device 120 and determining whether an acknowledgment was received from one or more of the notification devices 124, as in 432 and 434. When no acknowledgment is received from the notification devices 124, the method 400 can include the cloud server 122 transmitting the level four alert or notification to the notification devices 124 and/or the relevant emergency services provider and the ending the method 400, as in 430 and 418. In some embodiments, when an acknowledgment is received from the notification devices 124, the method 400 can include the cloud server 122 ending the method 400 as in 418. In some embodiments, the method 400 can include the cloud server 122 continuing to monitor the current condition of the user of wearable device for a change in the severity of the ambient temperature based hazard as in steps 426-430 even after the cloud server 122 receives an acknowledgment from one of the notification devices 124. For example, in some embodiments, the method 400 can include the cloud server 122 monitoring the current condition of the user of wearable device 120 for a change in the severity of the ambient temperature based hazard as in steps 426-430 until the current values of the plurality of sensors 126 as parsed by the wearer condition assessment sub-process indicate that the user of the wearable device 120 is no longer experiencing the ambient temperature based hazard.

In some embodiments, when the output of the wearer condition assessment sub-process from step 424 indicates that the user of the wearable device 120 is not ok, the method 400 can include the cloud server 122 initiating a temperature hazard mediation process, as in 436. In some embodiments the temperature hazard mediation process can include the cloud server 122 determining whether a temperature control integration module is enabled, as in 438. When the temperature control integration module fails to be enabled, the temperature hazard mediation process can include the cloud server 122 ending the temperature hazard mediation process and the method 400, as in 418. When the temperature control integration module is enabled, the temperature hazard mediation process can include the cloud server 122 comparing a location of the wearable device 120 to a location of a heating and/or cooling system controlled via the temperature control integration module, as in 442. Furthermore, when the location of the wearable device 120 is within a predetermined range of the location of the heating and/or cooling system controlled via the temperature control integration module, the temperature hazard mediation process can include the cloud server 122 activating the heating and/or cooling system via the temperature control integration module to raise or lower an ambient temperature at the location of the wearable device 120, as in 444. As seen in FIG. 15, in some embodiments, temperature control integration module can include a smart car integration module and the heating and/or cooling system can include the ventilation system of the smart car. Various other embodiments for the temperature control integration module the heating and/or cooling system are also contemplated such as a smart home heating and/or cooling system.

It should be noted that additional embodiments are contemplated where one or more of the steps of the method 400 described above as being carried out by the cloud server 122 are instead carried out by the wearable device 120 and one or more of the steps of the method 400 described above as being carried out by the wearable device 120 are instead carried out by the cloud server 122. For example, in some embodiments one or more of the steps shown in and described with respect to FIG. 14 can be carried out by the cloud server 122 rather than the wearable device 120 and one or more of the steps shown in and described with respect to FIG. 15 can be carried out on the wearable device 120 rather than the cloud server 122.

Figure 16:
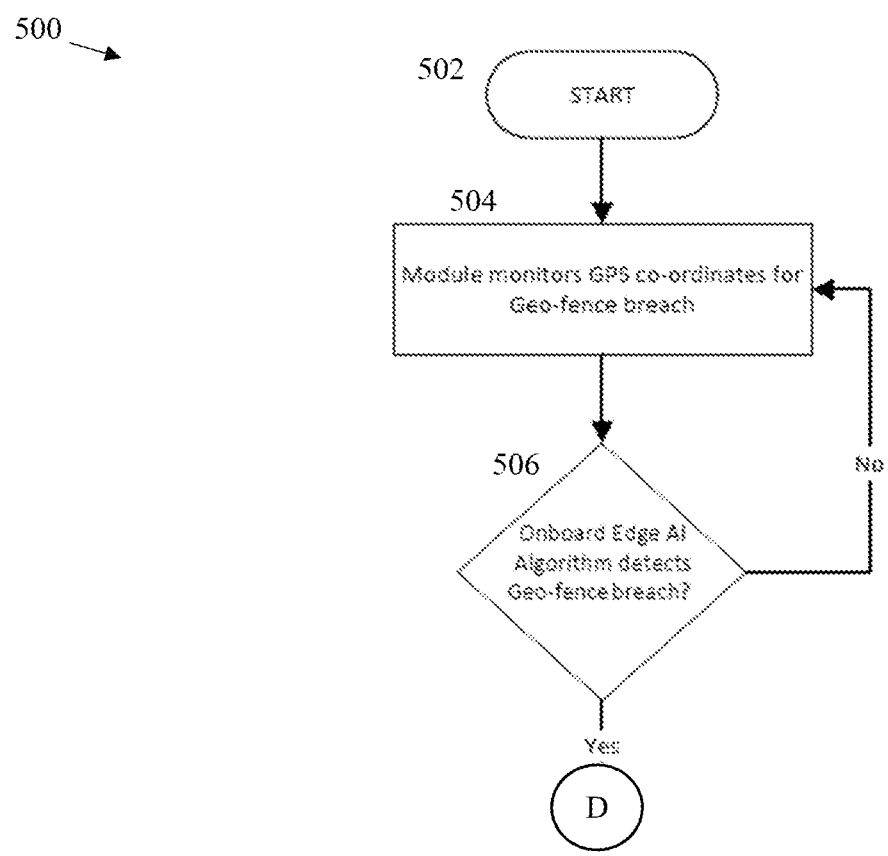
FIGS. 16-18 are a flow diagram for a Geo-fence breach hazard detection and alert method according to disclosed embodiments.
Figure 17:
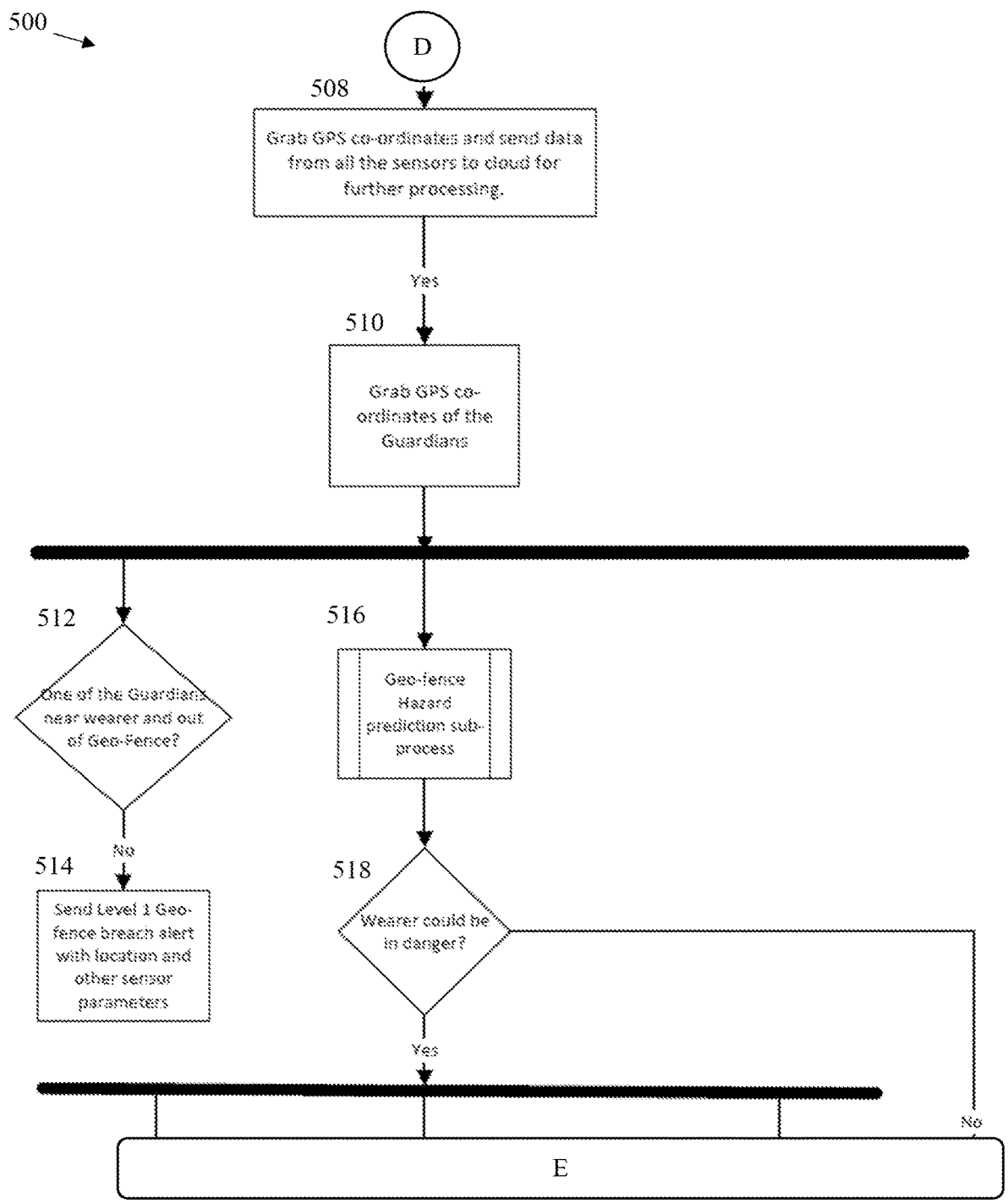
Figure 18:
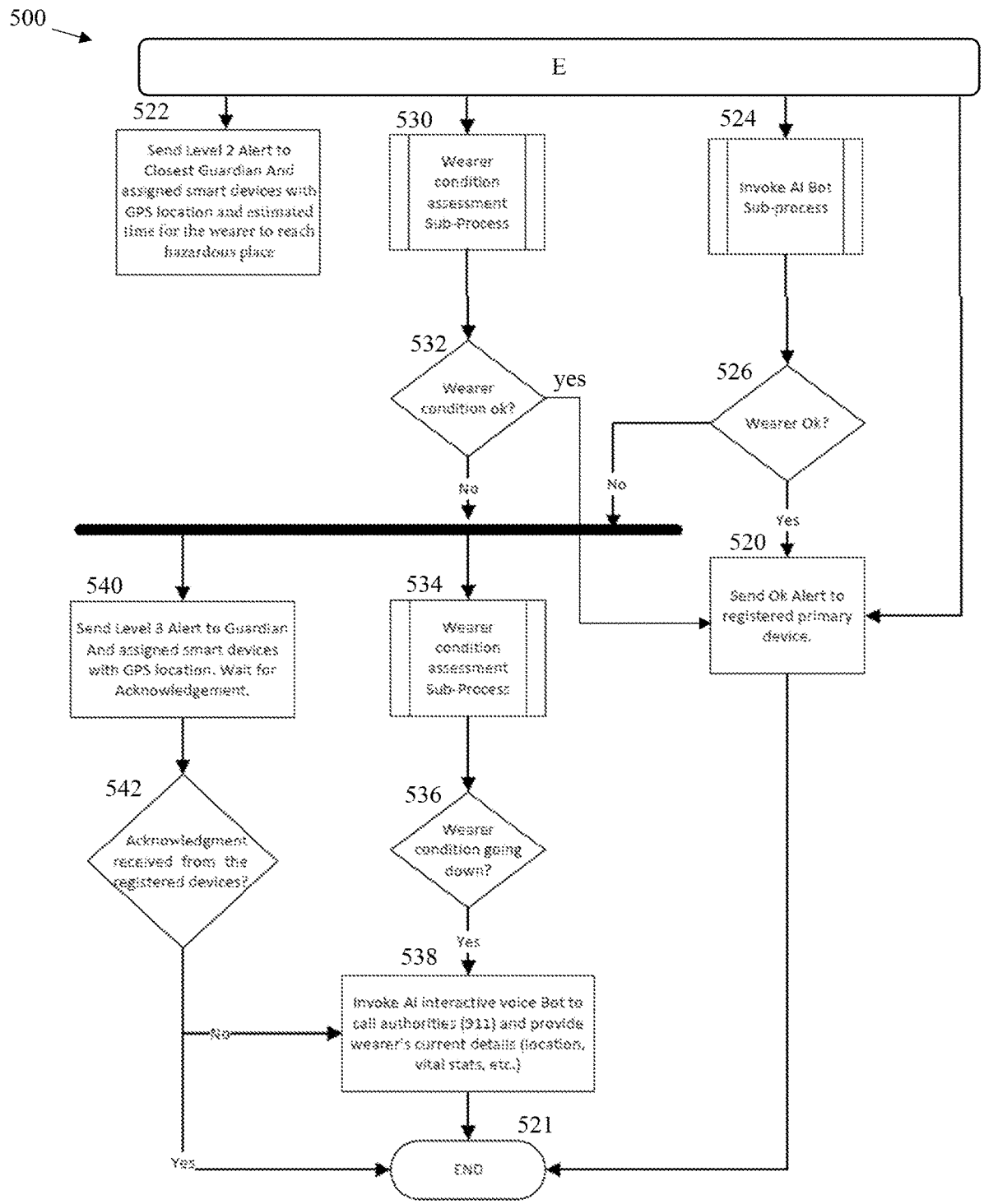

FIGS. 16-18 show a flow diagram for a geo-fence breach based hazard detection method 500 according to disclosed embodiments. In particular, FIG. 16 shows portions of the method 500 carried out by the wearable device 120 and includes starting the method 500 by having the wearable device 120 monitor location information from the location sensor 126F and processing the location information from the location sensor 126F with the onboard AI process to determine whether a geo-fence breach based anomaly is likely occurring to the user of the wearable device 120, as in 504 and 506. In some embodiments, the method 500 can include the wearable device 120 forgoing use of the onboard AI process and determining whether the geo-fence breach based anomaly is likely occurring to the user of the wearable device 120 by determining whether the location information indicates the wearable device 120 is inside or outside of to a preconfigured geo-fence location. In some embodiments, when, the geo-fence breach based anomaly is unlikely to be occurring, the method 500 can include the cloud server 122 continuing to perform steps 504 and 506. However, when the geo-fence breach based anomaly is likely to be occurring, the method 500 can include the cloud server 122 transmitting an indication of the geo-fence breach based anomaly to the cloud server 122.

Turning now to FIG. 17-18, the portions of the method 500 carried out by the cloud server 122 are shown. As seen in FIG. 17, after receiving the indication of the geo-fence breach based anomaly from the wearable device 120, the method 500 can include the cloud server 122 receiving the location information for the wearable device 120 from the location sensor 126F, the other data from the plurality of sensor 126, and location data for the registered device of the notification devices 24, as in 508 and 510. In some embodiments, the registered device can belong to guardians of the user of the wearable device 120. Furthermore, in some embodiments, the cloud server 122 can solicit or request, from the wearable device 120, the location information for the wearable device 120 from the location sensor 126F and the other data from the plurality of sensor 126. Similarly, in some embodiments, the cloud server 122 can solicit or request the location data for the registered device from the registered device.

After receiving the data from the wearable device 120 and the registered device, the method 500 can include the cloud server 122 determining whether the registered device is also outside of the geo-fence location, as in 512. When the registered device fails to be outside of the geo-fence location, the method 500 can include the cloud server 122 transmitting the level one or informational alert to the registered device in the notification devices 124 to inform the notification devices 124 of the geo-fence breach based anomaly, as in 514. In parallel with steps 512 and 514, the method 500 can include the cloud server 122 invoking a geo-fence hazard prediction sub-process and using the output thereof to predict and/or determine whether the user of the wearable device 120 is in danger, as in 516 and 518. As seen in FIG. 18, when the output of the geo-fence hazard prediction sub-process indicates that the user of the wearable device 120 is not in danger, the method 500 can include the cloud server 122 transmitting the all-clear alert or notification to the notification devices 124 including the registered device and then ending the method 500, as in 520 and 521.

As seen in FIG. 18, when the output of the geo-fence hazard prediction sub-process indicates that the user of the wearable device 120 is in danger, the method 500 can include the cloud server 122 transmitting a level two or warning alert to the primary and secondary devices in the notification devices 124 to inform the notification devices 124 of the present location based danger of the user of the wearable device 120, as in 522. In parallel with step 522, the method 500 can include the cloud server 122 invoking the AI bot process and using its output to determine whether the user of the wearable device 120 is ok or not (e.g. to determine whether the user of the wearable device 120 is experiencing the geo-fence breach based hazard), as in 524 and 526. When the output of the AI bot process indicates that the user of the wearable device 120 is ok, the method 500 can include the cloud server 122 transmitting the all-clear alert or notification to the notification devices 124 and then ending the method 500, as in 520 and 521.

Furthermore, in parallel with steps 522 and 524, the method 500 can include the cloud server 122 invoking the wearer condition assessment sub-process to parse the data from the plurality of sensors 126, as in 530. In some embodiments, the method 500 can include the cloud server 122 including a negative output from the AI bot process in the data parsed by the wearer condition assessment sub-process. However, in some embodiments such as shown in FIG. 18, the method 500 can include failing to include the negative output from the AI bot process in the data parsed by the wearer condition assessment sub-process and simply moving on to the steps 534 and 540 described herein when the AI bot process produces the negative output. Next, the method 500 can use the output of the wearer condition assessment sub-process to determine whether the user of the wearable device 120 is ok or not (e.g. to determine whether the user of the wearable device 120 is experiencing the geo-fence breach based hazard), as in 532. When the output of the wearer condition assessment sub-process indicates that the user of the wearable device 120 is ok, the method 500 can include the cloud server 122 transmitting the all-clear alert or notification to the notification devices 124 and then ending the method 500, as in 520 and 521.

However, when the output of the wearer condition assessment sub-process indicates that the user of the wearable device 120 is not ok (e.g. the user of the wearable device 120 is likely experiencing the geo-fence breach based hazard), the method 500 can include the cloud server 122 running the wearer condition assessment sub-process to monitor the current condition of the user of the wearable device 120 for any change based on changes in the data from the plurality of sensors 126 (e.g. to determine whether the geo-fence breach based hazard becomes more or less severe), as in 534 and 536. When the wearer condition assessment sub-process indicates that the current condition of the user of the wearable device 120 is going down or deteriorating, the method 500 can include the cloud server 122 transmitting the level four alert or notification to the notification devices 124 and/or the relevant emergency services provider informing both of the deteriorating geo-fence breach based hazard being experienced by the user of the wearable device 120 and then ending the method 500, as in 538 and 521. In some embodiments, the method 500 can include the cloud server 122 invoking the AI bot process to contact the relevant emergency service providers.

Additionally, when the output of the wearer condition assessment sub-process from step 530 indicates that the user of the wearable device 120 is not ok, the method 500 can include the cloud server 122 sending the level 3 alert to the notification devices 124 documenting the current state of the geo-fence breach based hazard being experienced by the user of the wearable device 120 and determining whether an acknowledgment was received from one or more of the notification devices 124, as in 540 and 542. When no acknowledgment is received from the notification devices 124, the method 500 can include the cloud server 122 transmitting the level four alert or notification to the notification devices 124 and/or the relevant emergency services provider and the ending the method 500, as in 538 and 521. In some embodiments, when an acknowledgment is received from the notification devices 124, the method 500 can include the cloud server 122 ending the method 500 as in 521. In some embodiments, the method 500 can include the cloud server 122 continuing to monitor the current condition of the user of wearable device for a change in the severity of the geo-fence breach based hazard as in steps 426-430 even after the cloud server 122 receives an acknowledgment from one of the notification devices 124. For example, in some embodiments, the method 500 can include the cloud server 122 monitoring the current condition of the user of wearable device 120 for a change in the severity of the geo-fence breach based hazard as in steps 426-430 until the current values of the plurality of sensors 126 as parsed by the wearer condition assessment sub-process indicate that the user of the wearable device 120 is no longer experiencing the geo-fence breach based hazard.

It should be noted that additional embodiments are contemplated where one or more of the steps of the method 500 described above as being carried out by the cloud server 122 are instead carried out by the wearable device 120 and one or more of the steps of the method 500 described above as being carried out by the wearable device 120 are instead carried out by the cloud server 122. For example, in some embodiments one or more of the steps shown in and described with respect to FIG. 16 can be carried out by the cloud server 122 rather than the wearable device 120 and one or more of the steps shown in and described with respect to FIGS. 17-18 can be carried out on the wearable device 120 rather than the cloud server 122.

Figure 19:
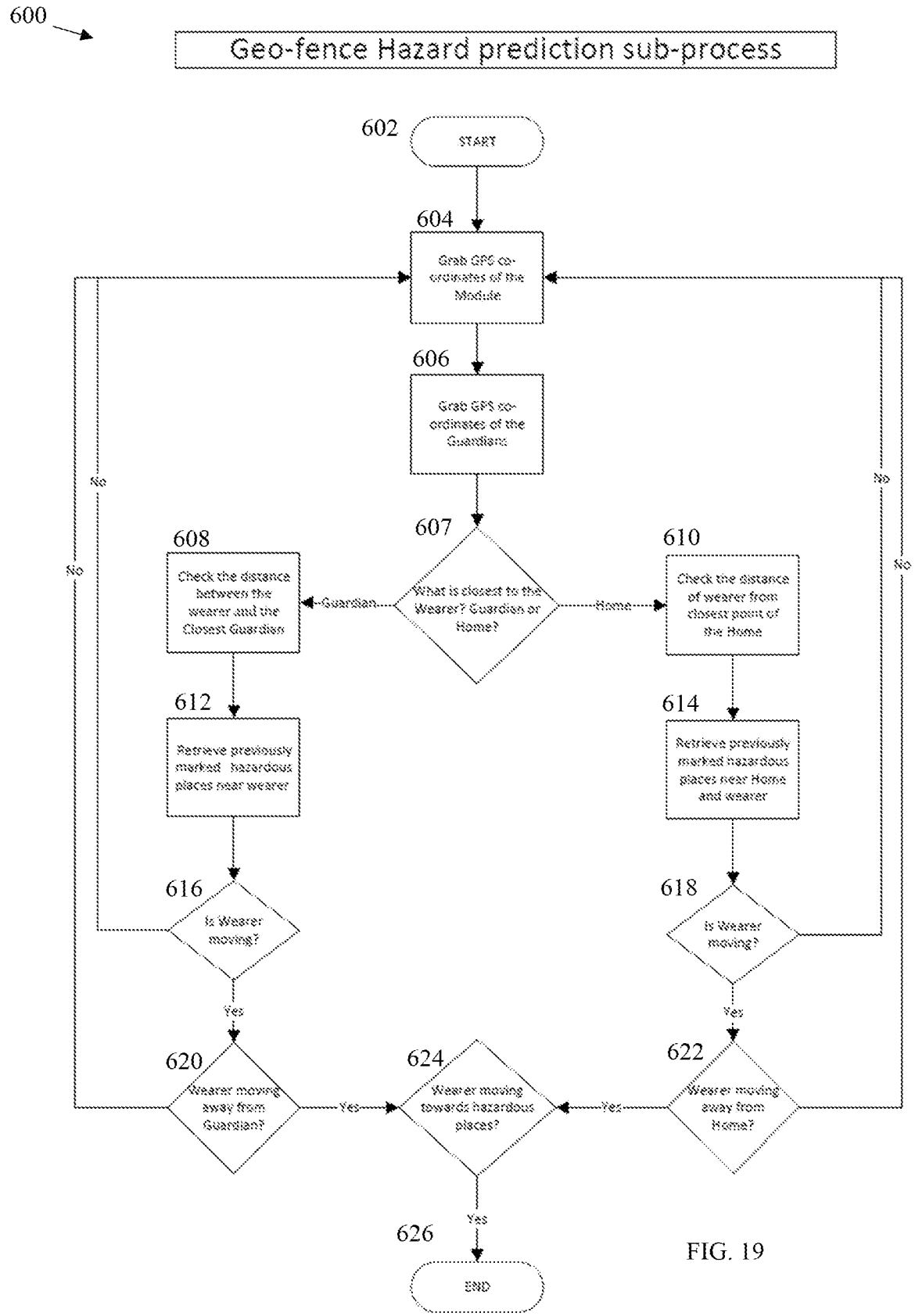
FIG. 19 is a flow diagram for a Geo-fence Hazard prediction sub-process according to disclosed embodiments.

FIG. 19 shows the geo-fence hazard detection sub-process 600 of the geo-fence breach based hazard detection method 500 according to disclosed embodiments. As seen in FIG. 19, the geo-fence hazard detection sub-process 600 can include the cloud server 122 starting the process and retrieving the current location of the wearable device 120, as in 602 and 604. In some embodiments, retrieving the current location of the wearable device 120 can include the cloud server retrieving global positioning system coordinates from the location sensor 126F. Next, the geo-fence hazard detection sub-process 600 can include the cloud server 122 retrieving the location data for the registered device of the notification device 124 (e.g. the device associated with the guardian of the user of the wearable device 120), as in 606.

After retrieving the relevant location information, the geo-fence hazard detection sub-process 600 can include the cloud server 122 identifying a closest safe location to the current location of the wearable device 120, as in 607. For example, in some embodiments, the closest safe location can include one of a home associated with the user of the wearable device 120 or the location of the guardian of the user of the wearable device 120 (e.g. the location of the registered device of the notification devices 124), Next, the geo-fence hazard detection sub-process 600 can include the cloud server 122 identifying a distance between the current location of the wearable device 120 and the closest safe location, as in 608 and 610, and retrieving from a memory device any previously marked hazard locations proximate to the location of the wearable device or the closest safe location, as in 612 and 614. In some embodiments, the previously marked hazard locations can include a road/highway, a body of water, ditch, or other unsafe locations such as would be known in the art.

Next, the geo-fence hazard detection sub-process 600 can include the cloud server 122 determining whether the user of the wearable device 120 is moving and whether the user of the wearable device 120 is moving away from the closest safe location, as in 616, 618, 620, and 622. When the user of the wearable device 120 is not moving and/or is not moving away from the closest safe location, the geo-fence hazard detection sub-process 600 can include the cloud server 122 continuing to perform the steps 604-622. However, when the user of the wearable device 120 is not moving and/or is not moving away from the closest safe location, the geo-fence hazard detection sub-process 600 can include the cloud server 122 determining whether the user of the wearable device 120 is moving towards any of the previously marked hazard locations, as in 624. In some embodiments, the geo-fence hazard detection sub-process 600 can include the cloud server 122 predicting an approximate length of time it will take the user of the wearable device 120 to reach one or more of the previously marked hazard locations and including the approximate length of time in any of the notifications sent to the notification devices 124. Finally, the geo-fence hazard detection sub-process 600 can include the cloud server 122 ending the sub-process 600, as in 626, and using the output thereof to predict and/or determine whether the user of the wearable device 120 is in danger, as in steps 516 and 518 of the method 500 shown in FIGS. 16-18.

In some embodiments, the geo-fence hazard detection sub-process 600 can include the cloud server 122 can use a real-time video feed from a camera on the wearable device 120 or a drone associated therewith to predict movements of the user of the wearable device 120 in relation to the previously marked hazard locations and/or the closest safe location. Furthermore, in some embodiments, the geo-fence hazard detection sub-process 600, can include the cloud server 122 learning routine activities and locations for the user of the wearable device and considering those learned activities and locations when assessing whether the geo-fence breach hazard is occurring or not.

It should be noted that additional embodiments are contemplated where one or more of the steps of the geo-fence hazard detection sub-process 600 described above as being carried out by the cloud server 122 are instead carried out by the wearable device 120. For example, in some embodiments one or more of the steps shown in and described with respect to FIG. 19 can be carried out by the wearable device 120 rather than the cloud server 122.

Figure 20:
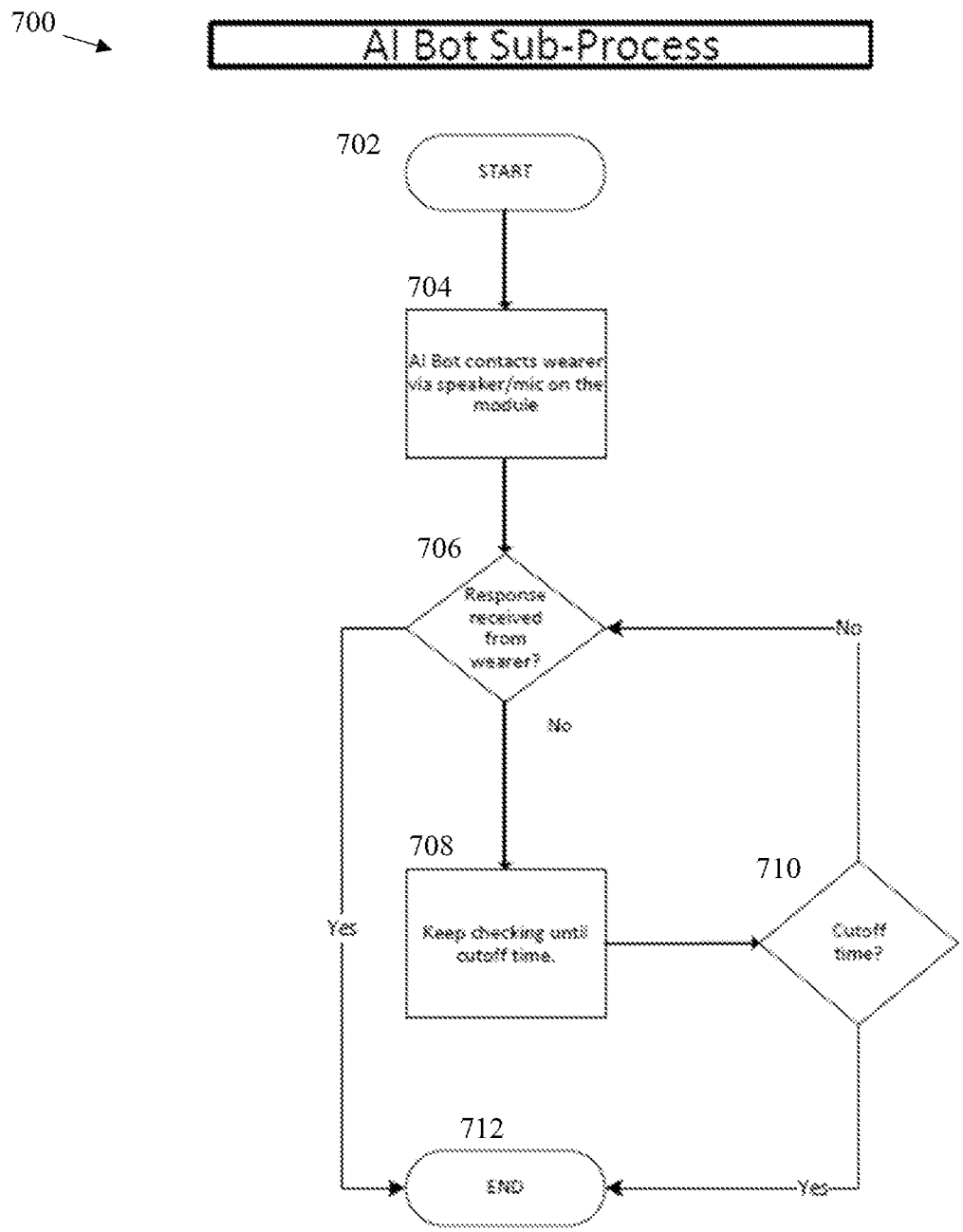
FIG. 20 is a flow diagram for an artificial intelligence bot sub-process according to disclosed embodiments.

FIG. 20 shows an embodiment of the AI bot process 700 used in the methods 200-500 to determine whether the user of the wearable device 120 is ok or not after the cloud server 122 receives the indication of one of the abnormal conditions from the wearable device 120. As seen in FIG. 20, in some embodiments, the AI bot process 700 can include the cloud server 122 starting the AI bot process 700 and accessing the voice services subsystem 144 including the microphone 132 and the audio output sub system 146 on the wearable device 120 to initiate an audio dialog session with the user of the wearable device 120, as in 704. In some embodiments the voice connection between the cloud server 122 and the wearable device 120 can include a direct communication channel. Then, the AI bot process 700 can include the cloud server 122 determining whether a response was received for the user of the wearable device 120, as in 706. When no response has been received, the AI bot process 700 can include the cloud serer 122 determining whether a cutoff time has been reached, as in 708 and 710. In some embodiments, the AI bot process 700 can include the cloud server 122 recording any response received from the user of the wearable device 120 before expiration of the cutoff time. When the cutoff time has not been reached, the AI bot process 700 can include the cloud server 120 continuing to perform the steps 706-710.

However, when the cutoff time has been reached and/or a response has been received by the user within the cutoff time, the AI bot process 700 can include the cloud server 122 ending the AI bot process 700, as in 712, and using the output thereof to determine whether the user of the wearable device 120 is ok or not as described in connection with the methods 200-500. For example, in some embodiments, the cloud server 122 can (1) conclude that the user of the wearable device 120 is ok when a positive response is received within the cutoff time; (2) conclude that the user of the wearable device 120 is not ok when a negative response is received within the cutoff time; and (3) incorporate that fact that no response was received within the cutoff time into the data parsed by the wearer condition assessment sub-process. In some embodiments, the AI bot process 700 can include the cloud server 122 recording any response received from the user of the wearable device 120 before expiration of the cutoff time. It should also be noted that, in some embodiments, the methods 200-500 can include the cloud server 122 invoking the AI bot process 700 to confirm that the user of the wearable device 120 is in a stable condition when the cloud server determines as much through one or more other processes such as using the wearer condition assessment sub-process described herein.

It should be noted that additional embodiments are contemplated where one or more of the steps of the AI bot process 700 described above as being carried out by the cloud server 122 are instead carried out by the wearable device 120. For example, in some embodiments one or more of the steps shown in and described with respect to FIG. 20 can be carried out by the wearable device 120 rather than the cloud server 122.

Figure 21:
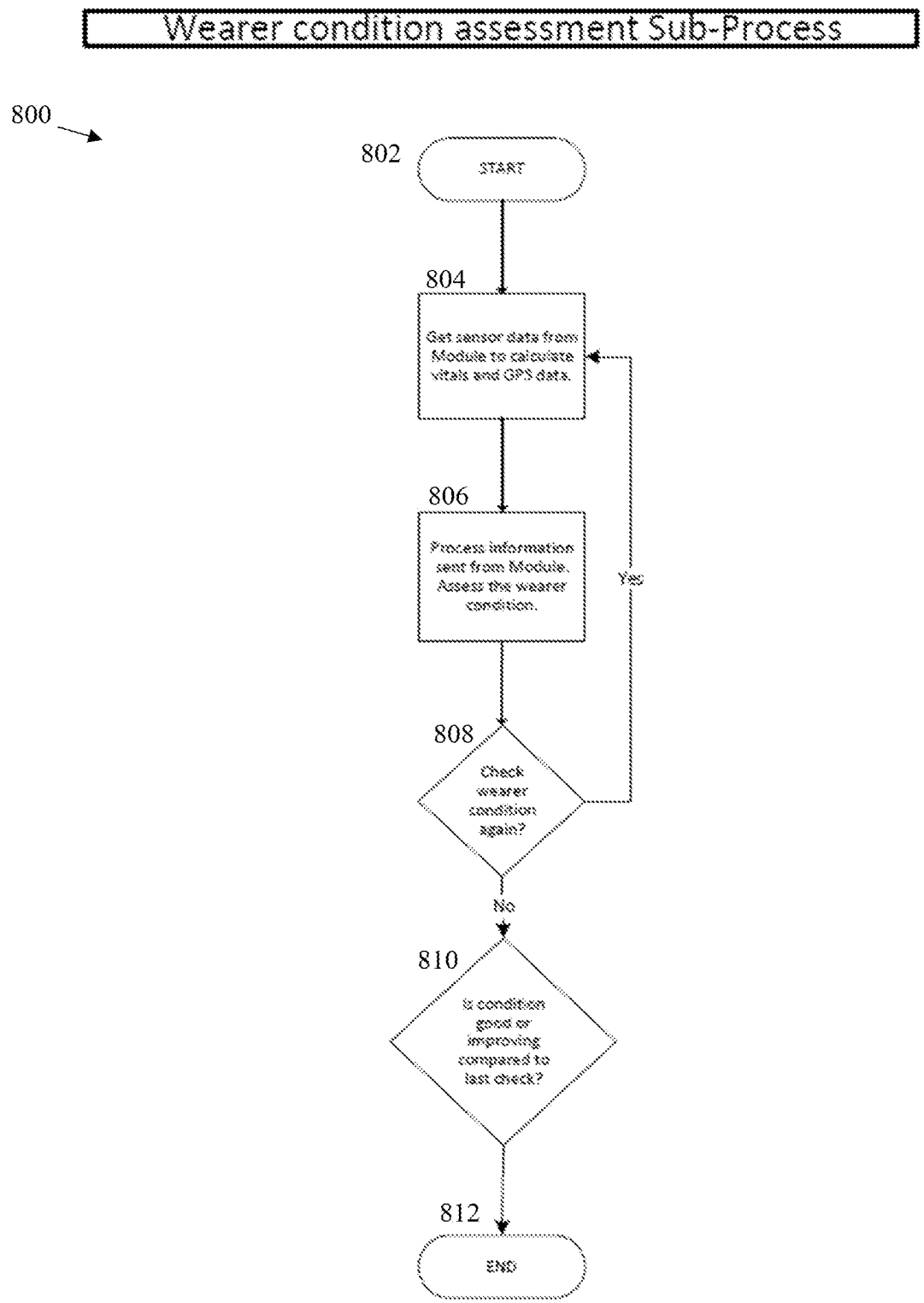
FIG. 21 is a flow diagram for a wearer condition assessment sub-process.

FIG. 21 shows an embodiment of the wearer condition assessment sub-process 800 used in connection with the methods 200-500 to determine whether the user of the wearable device 120 is ok or not and/or whether the current condition of the user of the wearable device 120 is deteriorating. As seen in FIG. 21, the wearer condition assessment sub-process 800 can include the cloud server 122 retrieving the data from the plurality of sensors 126 and parsing the data with the appropriate AI model to assess the current condition of the user of the wearable device 120, as in 804 and 806. Then, the wearer condition assessment sub-process 800 can include the cloud server 122 deciding whether to check the current condition again, as in 808. When the cloud server decides not to check the current condition again, the wearer condition assessment sub-process 800 can include the cloud server 122 determining whether the current condition is good, bad, improved since the last check, or deteriorating from the last check and then ending the wearer condition assessment sub-process 800, as in 810 and 812. As described herein in connection with the methods 200-500, the cloud server 122 can use the determination of whether the current condition is good, bad, improved since the last check, or deteriorating from the last check to determine whether the user of the wearable device 120 is ok or not and/or whether the current condition of the user of the wearable device 120 is deteriorating.

It should be noted that additional embodiments are contemplated where one or more of the steps of the wearer condition assessment sub-process 800 described above as being carried out by the cloud server 122 are instead carried out by the wearable device 120. For example, in some embodiments one or more of the steps shown in and described with respect to FIG. 21 can be carried out by the wearable device 120 rather than the cloud server 122.

Figure 22:
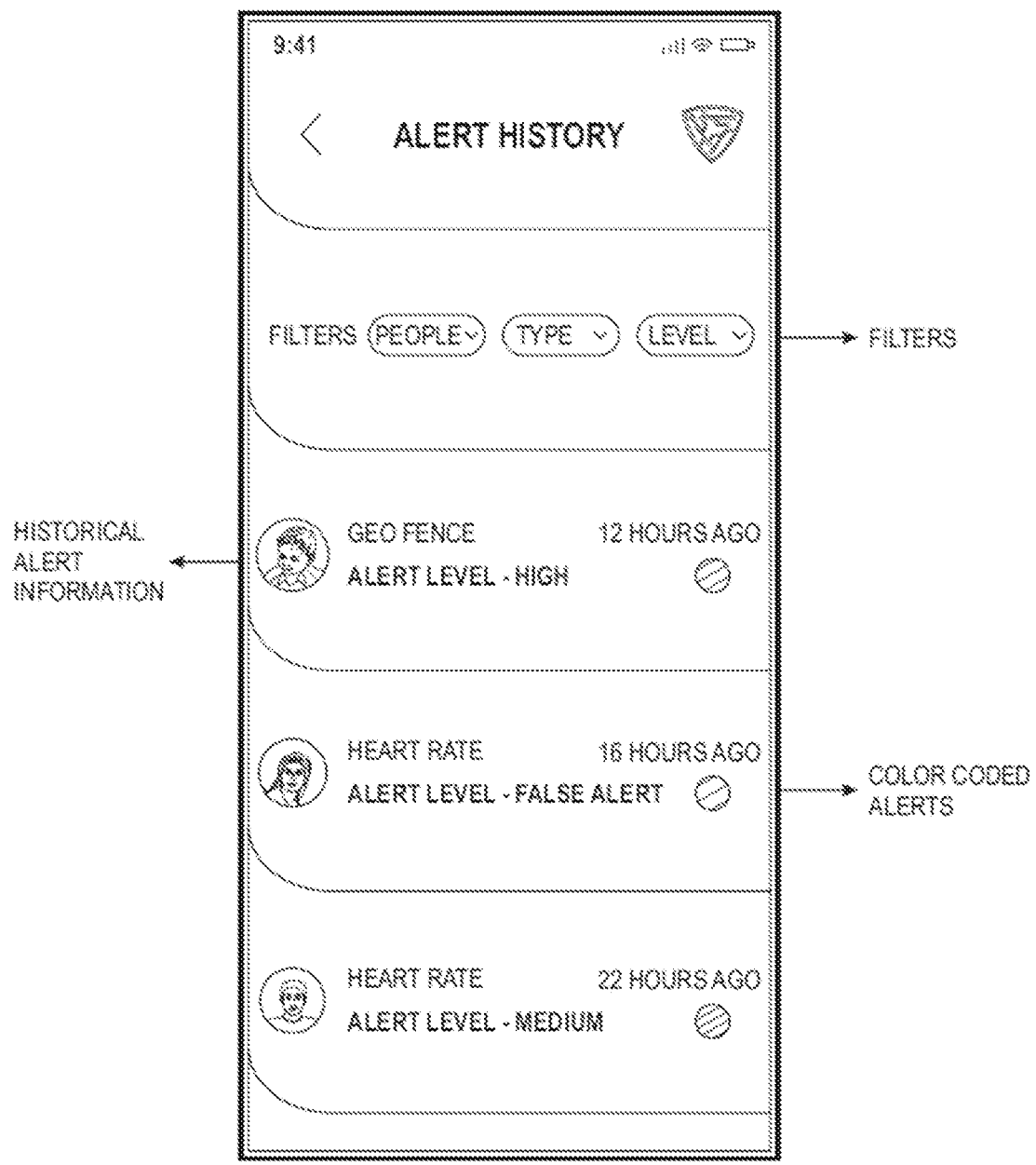
FIGS. 22-24 are renderings of a user interface used in conjunction with a personal safety alert system according to disclosed embodiments.
Figure 23:
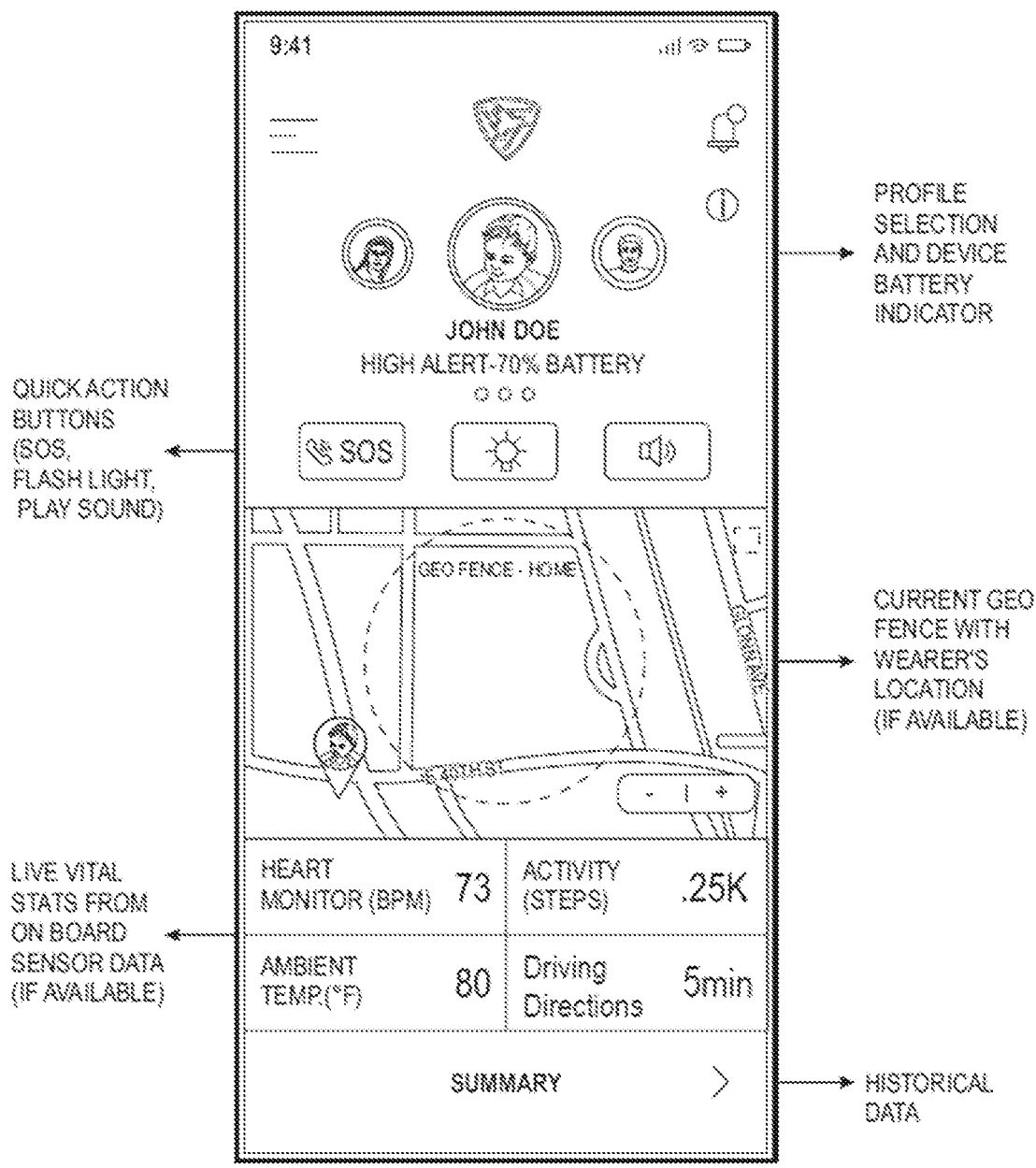
Figure 24:
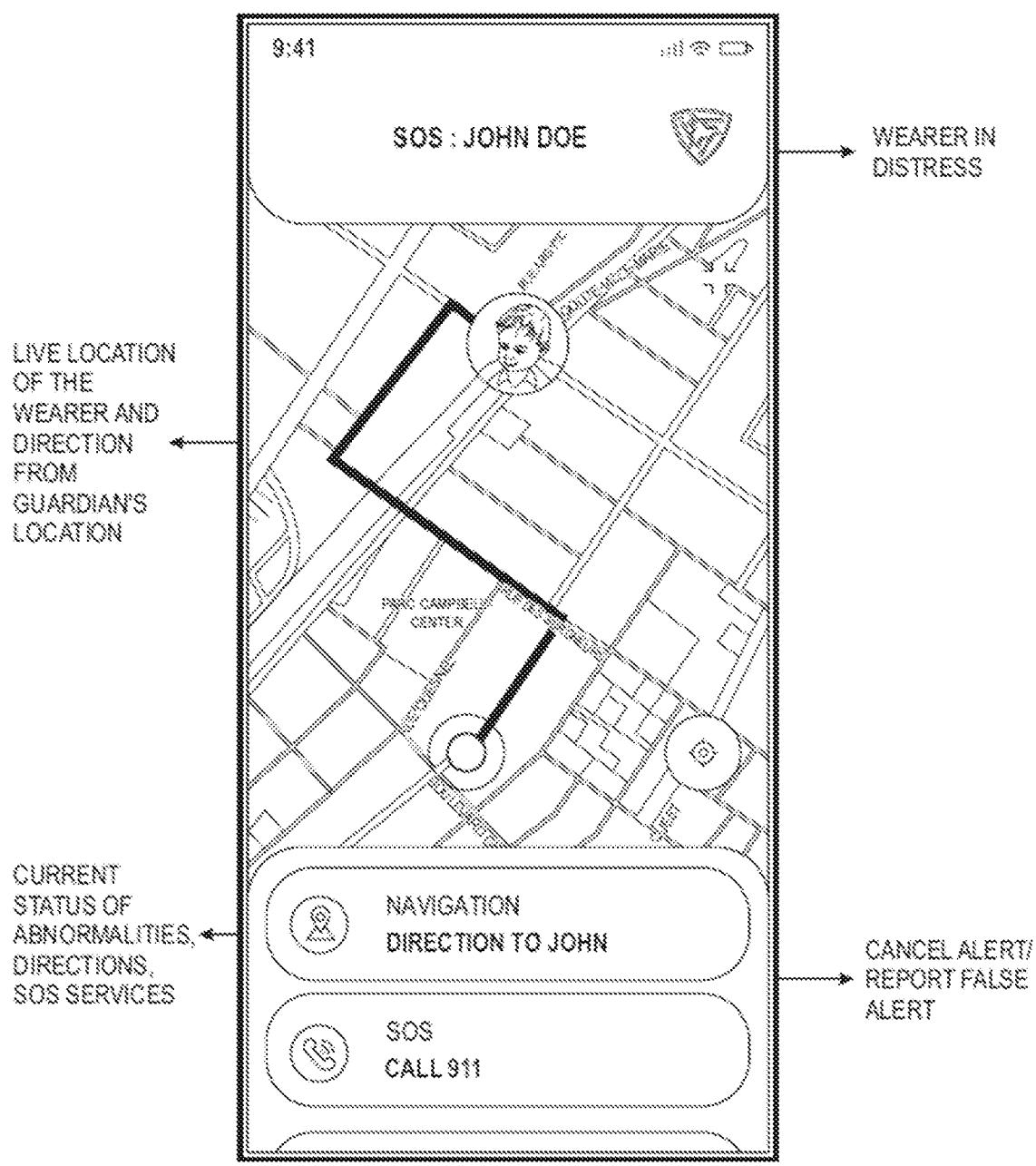

In some embodiments, the various preconfigured settings and processes described herein can be modified by through a user interface coupled to the cloud server 122 and/or the wearable device 120. In some embodiments, the user interface can be a mobile application displayed on one of the notification devices 124 such as the registered device. Furthermore, in some embodiments, the user interface can include one or more pages for documenting information about the wearable device 120 such as shown in FIGS. 22-24. For example, FIG. 22 shows a user interface screen documenting a history of alert notifications sent by the cloud server 122. Furthermore, FIGS. 22-23 show user interface screens used in connection with the detecting the geo-fence breach based hazard as described herein. In particular, FIG. 22 show a dashboard user interface screen and FIG. 23 shows a screen for a critical or level four alert notification. It should be understood that similar user interface screens are contemplated for use in connection with the other abnormal conditions or hazards monitored by the wearable device 120 and the cloud server 122.

Although a few embodiments have been described in detail above, other modifications are possible. For example, other components may be added to or removed from the described systems, and other embodiments may be within the scope of the invention.

From the foregoing, it will be observed that numerous variations and modifications may be affected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method, comprising:
monitoring sensor data at a wearable device, the sensor data being from a plurality of sensors electrically connected to the wearable device;
inputting the sensor data into an on-device artificial intelligence model;
in response to the on-device artificial intelligence model outputting an indication of a first triggering event of identification of an abnormal condition, transmitting, via the wearable device, a first notification comprising at least one of a level one notification, a level two notification, or a level three notification to a registered notification device documenting the abnormal condition;
receiving data at a cloud server from the wearable device when the wearable device detects an abnormal condition from at least a portion of the data, the data comprising at least a portion of the sensor data and the abnormal condition;
the cloud server determining a current condition of a user of the wearable device using the data;
the cloud server monitoring the current condition for a change; and
when the change in the current condition indicates a second triggering event of identification that the abnormal condition has deteriorated, the cloud server transmitting a second notification at a higher level than the transmitted first notification sent by the wearable device,
wherein the higher level second notification comprises at least one or more of:
a level two notification to the registered device,
a level three notification to the registered device and related devices, or
a level four notification to the registered device, the related devices, and an emergency response provider.

2. The method of claim 1, further comprising:
the cloud server processing the data with an artificial intelligence model to determine the current condition of the user of the wearable device,
wherein the artificial intelligence model is trained using historical data from the wearable device, historical data from another device, and/or manufactured data which include first known values corresponding to the abnormal condition being experienced and second known values corresponding to the abnormal condition not being experienced.

3. The method of claim 1, further comprising:
responsive to receiving the data, the cloud server soliciting feedback from the wearable device;
the cloud server determining that the current condition indicates that the user is not experiencing the abnormal condition when the feedback is positive and the cloud server receives the feedback within a predefined cutoff time;
the cloud server determining that the current condition indicates that the user is experiencing the abnormal condition when the feedback is negative and the cloud server receives the feedback within the predefined cutoff time; and
when the cloud server fails to receive the feedback before the predefined cutoff time, the cloud server including the failure to receive the feedback in the data and determining the current condition from the data.

4. The method of claim 3, wherein the feedback includes one or more of user input received on the wearable device, an audio signal received by the wearable device, an audio signal received by a user device located proximate to the wearable device, and/or a preconfigured movement of the wearable device.

5. The method of claim 3, further comprising the cloud server activating an artificial intelligence audio bot to interact with the user of the wearable device to solicit the feedback.

6. The method of claim 1, further comprising:
the wearable device detecting the abnormal condition from the portion of the data when a value of one of the plurality of sensors is outside a preconfigured threshold;
the cloud server selecting one of a plurality of artificial intelligence models based on the abnormal condition;
processing the data with the one of the plurality of artificial intelligence models to determine the current condition of the user of the wearable device,
wherein the one of the plurality of artificial intelligence models is trained using historical data from the wearable device, historical data from another device, and/or manufactured data which include first known values corresponding to the abnormal condition being experienced and second known values corresponding to the abnormal condition not being experienced.

7. The method of claim 6, wherein:
the abnormal condition includes one or more of a water-based hazard, an ambient temperature hazard, a fall hazard, and/or a geo-fence breach;
when the abnormal condition includes the water-based hazard, the one of the plurality of sensors includes a water contact sensor, a humidity sensor, and/or an atmospheric pressure sensor,
when the abnormal condition includes the ambient temperature hazard, the one of the plurality of sensors includes an ambient temperature sensor,
when the abnormal condition includes the fall hazard, the one of the plurality of sensors includes an impact sensor and/or an accelerometer, and
when the abnormal condition includes the geo-fence breach, the one of the plurality of sensors includes a location monitoring module.

8. The method of claim 1, further comprising, when the abnormal condition includes an ambient temperature hazard, the cloud server initiating a temperature hazard mediation process that includes:
the cloud server determining whether a temperature control integration module is enabled;
when the temperature control integration module fails to be enabled, the cloud server ending the temperature hazard mediation process;
when the temperature control integration module is enabled, the cloud server comparing a location of the wearable device to a location of a heating and/or cooling system controlled via the temperature control integration module; and
when the location of the wearable device is within a predetermined range of the location of the heating and/or cooling system controlled via the temperature control integration module, the cloud server activating the heating and/or cooling system via the temperature control integration module to raise or lower an ambient temperature at the location of the wearable device.

9. The method of claim 1, further comprising, when the abnormal condition includes a geo-fence breach, the cloud server initiating a geo-fence hazard prediction process that includes:
the cloud server identifying a closest safe location to a location of the wearable device;
the cloud server retrieving from a memory device any previously marked hazard locations proximate to the location of the wearable device or the safe location; and
the cloud server determining the current condition of the user of the wearable device responsive to determining that the wearable device is moving away from the safe location and towards any of the previously marked hazard locations.

10. A cloud server, comprising:
a programmable processor; and
a communication interface electronically coupled to the programmable processor,
wherein the communication interface receives data from a wearable device when the wearable device detects a first triggering event of identification of an abnormal condition from at least a portion of the data,
wherein the data comprises at least sensor data and the abnormal condition,
wherein the programmable processor determines a current condition of a user of the wearable device using the data and monitors the current condition for a change, and
wherein, when the programmable processor determines that change in the current condition indicates a second triggering event of identification that the abnormal condition has deteriorated, the programmable processor transmits, a second notification at a higher level than a previously-transmitted first notification sent by the wearable device upon initial detection of the abnormal condition, and
wherein the higher level second notification comprises a level four notification sent to a registered device, related devices, and an emergency response provider.

11. The cloud server of claim 10, further comprising:
a memory that stores an artificial intelligence model executable by the programmable processor to determine the current condition of the user of the wearable device,
wherein the artificial intelligence model is trained using historical data from the wearable device, historical data from another device, and/or manufactured data which include first known values corresponding to the abnormal condition being experienced and second known values corresponding to the abnormal condition not being experienced.

12. The cloud server of claim 10, wherein:
the programmable processor solicits feedback from the wearable device responsive to receiving the data;
the programmable processor determines that the current condition indicates that:
the user is not experiencing the abnormal condition when the feedback is positive and the programmable processor receives the feedback within a predefined cutoff time; and
the user is experiencing the abnormal condition when the feedback is negative and the programmable processor receives the feedback within the predefined cutoff time; and
when the programmable processor fails to receive the feedback before the predefined cutoff time, the programmable processor includes the failure to receive the feedback in the data and determines the current condition from the data.

13. The cloud server of claim 12, wherein the feedback includes one or more of user input received on the wearable device, an audio signal received by the wearable device, an audio signal received by a user device located proximate to the wearable device, and/or a preconfigured movement of the wearable device.

14. The cloud server of claim 12, further comprising:
a memory that stores an artificial intelligence audio bot executable by the programmable processor to interact with the user of the wearable device to solicit the feedback.

15. The cloud server of claim 10, further comprising:
a memory that stores a plurality of artificial intelligence models executable by the programmable processor to determine the current condition of the user of the wearable device,
wherein the programmable processor selects one of a plurality of artificial intelligence models based on the abnormal condition and processed the data with the one of the plurality of artificial intelligence models to determine the current condition of the user of the wearable device,
wherein the one of the plurality of artificial intelligence models is trained using historical data from the wearable device, historical data from another device, and/or manufactured data which include first known values corresponding to the abnormal condition being experienced and second known values corresponding to the abnormal condition not being experienced, and
wherein the abnormal condition includes one or more of a water-based hazard, an ambient temperature hazard, a fall hazard, and/or a geo-fence breach.

16. The cloud server of claim 10, wherein, when the abnormal condition includes an ambient temperature hazard, the programmable processor initiates a temperature hazard mediation process that includes:
the programmable processor determining whether a temperature control integration module is enabled;
when the temperature control integration module fails to be enabled, the programmable processor ending the temperature hazard mediation process;
when the temperature control integration module is enabled, the programmable processor comparing a location of the wearable device to a location of a heating and/or cooling system controlled via the temperature control integration module; and
when the location of the wearable device is within a predetermined range of the location of the heating and/or cooling system controlled via the temperature control integration module, the programmable processor activating the heating and/or cooling system via the temperature control integration module to raise or lower an ambient temperature at the location of the wearable device.

17. The cloud server of claim 10, wherein, when the abnormal condition includes a geo-fence breach, the programmable processor initiates a geo-fence hazard prediction process that includes:
the programmable processor identifying a closest safe location to a location of the wearable device;
the programmable processor retrieving from a memory device any previously marked hazard locations proximate to the location of the wearable device or the safe location; and
the programmable processor determining the current condition of the user of the wearable device responsive to determining that the wearable device is moving away from the safe location and towards any of the previously marked hazard locations.

18. A wearable device, comprising:
a programmable processor;
a plurality of sensors electrically connected to the programmable processor; and
a communication interface electronically coupled to the programmable processor,
wherein the programmable processor monitors sensor data from the plurality of sensors to detect a first triggering event of identification of an abnormal condition from at least a portion of the sensor data,
wherein detecting the abnormal condition comprises:
inputting the sensor data into an on-device artificial intelligence model;
outputting an indication of the abnormal condition; and
in response to the on-device artificial intelligence model outputting the abnormal condition:
transmitting, via the wearable device, a first notification comprising at least one of a level one notification, a level two notification, or a level three notification to a registered notification device documenting the abnormal condition;
the programmable processor transmits an indication of the abnormal condition and the data to a cloud server via the communication interface; and
upon detection of a second triggering event of identification that the abnormal condition has worsened, the cloud server transmitting a second notification at a higher level than the first notification, the second notification comprising at least one of:
a level two notification to the registered notification device;
a level three notification to the registered notification device and related devices; or
a level four notification to the registered notification device, the related devices, and an emergency response provider.

19. The wearable device of claim 18, wherein the programmable processor detects the abnormal condition from the portion of the data when a value of one of the plurality of sensors is outside a preconfigured threshold.

20. The wearable device of claim 18, wherein the programmable processor transmits feedback on a status of a wearer of the user device in response to receiving a request for feedback from the cloud server,
wherein the feedback includes one or more of user input received on a user interface of the wearable device, an audio signal received by a microphone of the wearable device, and/or a preconfigured movement of the wearable device, and
wherein when the feedback includes the audio signal, the programmable processor activates an artificial intelligence audio bot to interact with the user of the wearable device to solicit the feedback.

* * * * *